US006628271B1

(12) United States Patent
Matsumoto et al.

(10) Patent No.: US 6,628,271 B1
(45) Date of Patent: Sep. 30, 2003

(54) TOUCH PANEL DEVICE

(75) Inventors: Kanya Matsumoto, Tokyo (JP); Jiro Nakazono, Yamagata (JP)

(73) Assignees: Pioneer Corporation, Tokyo (JP); Tohoku Pioneer Corporation, Yamagata (JP)

(*) Notice: Subject to any disclaimer, the term of this patent is extended or adjusted under 35 U.S.C. 154(b) by 295 days.

(21) Appl. No.: 09/711,912

(22) Filed: Nov. 15, 2000

(30) Foreign Application Priority Data

Nov. 15, 1999 (JP) .......................................... 11-324095

(51) Int. Cl.[7] .............................. G09G 5/00; G06K 11/06
(52) U.S. Cl. ..................... 345/179; 345/173; 345/177; 178/18.01
(58) Field of Search ................................. 345/173, 177, 345/179, 182, 180; 172/18.01, 18.02, 18.04, 19.01, 19.02

(56) References Cited

U.S. PATENT DOCUMENTS

| 4,777,329 A | * | 10/1988 | Mallicoat | ................. | 178/19.02 |
| 4,885,433 A | * | 12/1989 | Schier | ..................... | 178/20.04 |
| 5,610,629 A | * | 3/1997 | Baur | ........................... | 345/104 |
| 5,973,677 A | * | 10/1999 | Gibbons | ....................... | 345/179 |
| 6,064,373 A | * | 5/2000 | Ditzik | ......................... | 345/173 |
| 6,288,711 B1 | * | 9/2001 | Tanaka et al. | .............. | 345/179 |

* cited by examiner

Primary Examiner—Richard Hjerpe
Assistant Examiner—Duc Dinh
(74) Attorney, Agent, or Firm—Sughrue Mion, PLLC

(57) ABSTRACT

An input pen has an oscillator and a piezoelectric loudspeaker, a frequency/output-level setting circuit for setting a frequency or an output level of a ultrasonic wave oscillated from the oscillator, and a touch sensor for changing a set value of the frequency/output-level setting circuit. A touch panel device comprises microphones for sensing the frequency or the output level of the ultrasonic wave oscillated from the oscillator of the input pen at a touch position on a touch panel by the input pen; a microcomputer for setting attributes of input information in response to the frequency or the output level of the ultrasonic wave sensed by the microphones; and a PDP displaying device for displaying the input information on the flat display device based on the set attributes.

32 Claims, 17 Drawing Sheets

3.4mm

10° (≒ 0.094mm)

TOUCH PANEL DEVICE

BACKGROUND OF THE INVENTION

1. Field of the Invention

The present invention relates to a touch panel device in which information are input by an input pen onto a touch panel that is provided in front of a flat display such as a plasma display panel, etc.

2. Description of the Related Art

In recent years, the touch panel device has been spread as the inputting means for various information processing devices.

This touch panel device senses a coordinate of a touch position on the touch panel, and inputs various information into the information processing device in response to the touch position. Various systems have been proposed.

Out of the touch panel devices, there is the system that senses the coordinate of the touch position on the touch panel by utilizing the ultrasonic wave.

FIG. 25 is a schematic view showing the touch panel device utilizing the ultrasonic wave, called the ultrasonic surface acoustic wave system, in the conventional art.

In FIG. 25, the touch panel device comprises an X-side reflection array 2A on the transmitter side, which is provided horizontally to a lower edge portion of a touch panel 1; an X-side transmitter 2B arranged on the lower right-hand corner of the touch panel 1 and connected to the X-side reflection array 2A; an X-side reflection array 3A on the receiver side, which is provided horizontally to an upper edge portion of the touch panel 1 so as to oppose to the X-side reflection array 2A; an X-side receiver 3B arranged on the upper right-hand corner of the touch panel 1 and connected to the X-side reflection array 3A; a Y-side reflection array 4A on the transmitter side, which is provided vertically to a left-side edge portion of the touch panel 1; a Y-side transmitter 4B arranged on the upper left-hand corner of the touch panel 1 and connected to the Y-side reflection array 4A; a Y-side reflection array 5A on the receiver side, which is provided vertically to a right-side edge portion of the touch panel 1 so as to oppose to the Y-side reflection array 4A; and a Y-side receiver 5B arranged on the upper right-hand corner of the touch panel 1 and connected to the Y-side reflection array 5A.

In this touch panel device, the ultrasonic wave that is output from the X-side transmitter 2B is oscillated upward in the vertical direction from respective positions, which are provided along the axis direction (X direction) of the X-side reflection array 2A on the transmitter side, to the X-side reflection array 3A on the receiver side. Then, the ultrasonic wave that is received at respective positions, which are provided along the axis direction (X direction) of the X-side reflection array 3A on the receiver side, is input into the X-side receiver 3B.

Also, the ultrasonic wave that is output from the Y-side transmitter 4B is oscillated rightward in the horizontal direction from respective positions, which are provided along the axis direction (Y direction) of the Y-side reflection array 4A on the transmitter side, to the Y-side reflection array 5A on the receiver side. Then, the ultrasonic wave that is received at respective positions, which are provided along the axis direction (Y direction) of the Y-side reflection array 5A on the receiver side, is input into the X-side receiver 5B.

Then, identification of the touch position on the touch pane 1 is carried out as follows. For example, when any position P' on the touch panel 1 is touched as shown, the ultrasonic waves that are oscillated respectively from the X-side reflection array 2A and the Y-side reflection array 4A on the transmitter side are blocked by the finger, the input pen, or the like, that touches the touch panel 1. Therefore, the positions (x coordinate and y coordinate) on the X-side reflection array 3A and the Y-side reflection array 5A on the receiver side can be detected based on change (attenuation) of the ultrasonic signals that are input into the X-side receiver 3B and the X-side receiver 5B.

Then, in such touch panel device, in the event that the information input onto the screen of the flat display, to which the touch panel is fitted, by the input pen is tried, such a method is employed in the conventional art in order to set attributes of the input information that the attribute information display column, as set forth in Patent Application Publication (KOKAI) Hei 9-146679, for example, is displayed on the screen of the flat display and then the area of the attribute information display column which displays the desired attribute therein is touched by the input pen.

However, in such input information attribute setting method in the conventional art, there is such a problem that, since the above attribute information display column must be displayed on the screen of the flat display and then the area in which the desired attribute is displayed is touched by the input pen every time when the attribute is to be set, the operations are very troublesome. Also, in the event that the attribute information display column is always displayed on the screen of the flat display, there is a problem such that the image display screen of the flat display is narrowed.

SUMMARY OF THE INVENTION

The present invention has been made to overcome the problems that are included in the above touch panel device in the conventional art.

That is, it is an object of the present invention to provide a touch panel device capable of setting attributes of input information by simple operations without reduction in an image display screen of a flat display.

In order to achieve the above object, according to a first aspect of the invention, there is provided a touch panel device for displaying information containing predetermined attributes on a flat display device by touching a touch panel provided in front of the flat display device by an input pen, wherein the input pen has a signal oscillating means, a setting means for setting a frequency or an output level of an oscillated signal oscillated from the signal oscillating means, and a set value changing means for changing a set value of the frequency or the output level in the setting means, the device comprising a sensing means for sensing the frequency or the output level of the oscillated signal oscillated from the signal oscillating means in the input pen at a touch position on the touch panel by the input pen; an attribute setting means for setting attributes of input information in response to the frequency or the output level of the oscillated signal sensed by the sensing means; and a displaying means for displaying the input information on the flat display device based on the attributes set by the attribute setting means.

According to the touch panel device of the first ascpect of the invention, when the pen point portion of the input pen is pushed against the touch panel being provided in front of the flat display device to touch it, the transmitted signal whose frequency or output level is set by the setting means can be transmitted from the signal oscillating means being built in the input pen.

Then, the frequency or output level of the transmitted signal transmitted from the input pen can be sensed by the sensing means provided to the touch panel.

When the frequency or output level of the transmitted signal transmitted from the input pen is sensed by the sensing means in this manner, the attribute setting means can set the attributes of the image, e.g., colors, area sizes, types, etc. of the image to display the input information on the flat display device in response to the frequency or the output level of the sensed transmitted signal, and then can cause the displaying means to display the input information on the flat display device based on the set attributes.

As described above, according to the touch panel device of the above first invention, since the attributes of the input information to be displayed on the flat display device can be set easily by merely changing the frequency or output level of the oscillated signal being oscillated from the input pen to sense the touch position, the setting operation can be simplified and also there is no necessity to display the attribute information display column on the screen of the flat display device, unlike the conventional art. Therefore, the problem such that an area on the flat display device used to display the image is narrowed can be eliminated.

In order to achieve the above object, according to a second aspect of the invention, in addition to the configuration of the first invention, the attributes of the input information are colors of the input information to be displayed on the flat display device.

According to the touch panel device of the second aspect of the invention, the attributes of the input information, e.g., colors of touch mark, line drawing, etc., that are displayed by the touch of the input pen onto the touch panel at the position corresponding to the touch position of the flat display device, can be set in response to the frequency or output level of the oscillated signal oscillated from the input pen.

In order to achieve the above object, according to a third aspect of the invention, in addition to the configuration of the first invention, the attributes of the input information are image areas of the input information to be displayed on the flat display device.

According to the touch panel device of the third aspect of the invention, the attributes of the input information, e.g., image size such as thickness, size, etc. of touch mark, line drawing, etc., that are displayed by the touch of the input pen onto the touch panel at the position corresponding to the touch position of the flat display device, can be set in response to the frequency or output level of the oscillated signal oscillated from the input pen.

In order to achieve the above object, according to a fourth aspect of the invention, in addition to the configuration of the first invention, the attributes of the input information are image types of the input information to be displayed on the flat display device.

According to the touch panel device of the fourth aspect of the invention, the attributes of the input information, e.g., image types such as solid display line, dotted display line, etc., that are displayed by the touch of the input pen onto the touch panel at the position corresponding to the touch position of the flat display device, can be set in response to the frequency or output level of the oscillated signal oscillated from the input pen.

In order to achieve the above object, according to a fifth aspect of the invention, in addition to the configuration of the first invention, the set value changing means of the input pen is a sensor means that is provided to the input pen and changes the set value of the frequency or the output level set by the setting means by sensing a pressure generated when the input pen touches the touch panel.

According to the touch panel device of the fifth aspect of invention, when the input pen touches the touch panel, the pushing force of the input pen onto the touch panel can be sensed by the sensor means fitted to the input pen, and then the set value changing means can change the set value of the frequency or output level of the oscillated signal being oscillated from the signal oscillating member in answer to the sensed pushing force of the input pen onto the touch panel.

Accordingly, the operator can easily select the attributes of the input information by adjusting the pushing force of the input pen onto the touch panel.

In order to achieve the above object, according to a sixth aspect of the invention, in addition to the configuration of the first invention, the set value changing means of the input pen is a sensor means that is provided to the input pen and changes the set value of the frequency or the output level set by the setting means according to a number of times or a time sensed when the input pen touches the touch panel.

According to the touch panel device of the sixth aspect of the invention, when the input pen touches the touch panel, the touch number of times or touch time of the input pen onto the touch panel can be sensed by the sensor means fitted to the input pen, and then the set value changing means can change the set value of the frequency or output level of the oscillated signal being oscillated from the signal oscillating member in answer to the sensed touch number of times or touch time of the input pen onto the touch panel.

Accordingly, the operator can easily select the attributes of the input information by adjusting the touch number of times or touch time of the input pen onto the touch panel.

In order to achieve the above object, according to a seventh aspect of the invention, in addition to the configuration of the fifth or sixth invention, a touch panel device further comprises a light emitting means provided to the input pen and connected to the sensor means, and turned ON when touch of the input pen onto the touch panel is sensed by the sensor means.

According to the touch panel device of the seventh aspect of the invention, when the input pen touches the touch panel, the touch can be sensed by the sensor means and then the light emitting means can be turned ON.

Accordingly, the operator can easily sense visually that the input pen surely touches the touch panel.

In order to achieve the above object, according to an eighth aspect of the invention, in addition to the configuration of the first invention, the set value changing means of the input pen is a change-over switch means that is provided to the input pen and changes the set value of the frequency or the output level set by the setting means by switching the change-over switch means.

According to the touch panel device of the eighth aspect of the invention, the set value of the frequency or the output level in the setting means can be changed by manually switching the change-over switch means.

In order to achieve the above object, according to a ninth aspect of the invention, in addition to the configuration of the first aspect of the invention, the oscillated signal oscillated by the signal oscillating means of the input pen is an acoustic wave or a ultrasonic wave.

According to the touch panel device of the ninth aspect of the invention, the acoustic wave or the ultrasonic wave can be oscillated from the pen point portion of the input pen, and then the acoustic wave or the ultrasonic wave can be propagated in the space over the touch panel along the touch panel and then sensed by the sensing means.

In order to achieve the above object, according to a tenth aspect of the invention, in addition to the configuration of the first invention, the sensing means is a microphone.

According to the touch panel device of the tenth aspect of the invention, the oscillated signal such as the acoustic wave or the ultrasonic wave oscillated from the signal oscillating means in the input pen can be sensed by the microphone serving as the sensing means.

In order to achieve the above object, according to an eleventh invention, in addition to the configuration of the first invention, the signal oscillating means is a piezoelectric loudspeaker containing a piezoelectric element.

According to the touch panel device of the eleventh aspect of the invention, the oscillated signal such as the acoustic wave, the ultrasonic wave, or the like can be oscillated from the piezoelectric loudspeaker containing the piezoelectric element.

In order to achieve the above object, according to a twelfth aspect of the invention, in addition to the configuration of the first invention, the input pen has an opening portion formed at a top end portion, and the oscillated signal that is output by the signal oscillating means being built in the input pen is oscillated from the opening portion to have a directivity of 360 degree around a penholder of the input pen.

According to the touch panel device of the twelfth aspect of the invention, when the input pen touches the touch panel, the oscillated signal being output from the signal oscillating means built in the input pen is oscillated from the opening portions formed at the pen point portion of the input pen around the penholder of the input pen to have the directivity of 360°.

Therefore, everywhere the input pen touches the touch panel, the oscillated signal can be sensed by the sensing means and thus the touch position can be identified without fail.

In order to achieve the above object, according to a thirteenth aspect of the invention, in addition to the configuration of the first invention, an inner wall surface of the pen point portion of the input pen is formed as a circular cone shape such that a diameter is reduced smaller toward a top end side, an inside of the circular cone shape is communicated to an outside via an opening portion that is formed on a top end of the input pen, and the oscillated signal output from the signal oscillating means via the inside of the circular cone shape formed at the pen point portion of the input pen is oscillated from the opening portion.

According to the touch panel device of the thirteenth aspect of the invention, the inner wall surface of the pen point portion of the input pen, through which the oscillated signal being output from the signal oscillating means built in the input pen is passed, is formed as the circular cone shape. Therefore, the oscillated signal oscillated from the opening portion formed at the top end can have the non-directivity.

In order to achieve the above object, according to a fourteenth aspect of the invention, in addition to the configuration of the first invention, a top end of the input pen is formed like a spherical shape, and opening portions that oscillate the oscillated signal being output from the signal oscillating means to an outside are formed on an outer peripheral surface of the input pen in rear of the top end being formed like a spherical shape.

According to the touch panel device of the fourteenth aspect of the invention, since the top end of the input pen is formed like the spherical shape, it can be prevented that the surface of the touch panel is damaged when the input pen touches the touch panel. In addition, since the opening portions formed to oscillate the oscillated signal being output from the signal oscillating means to the outside are formed on the outer peripheral surface in rear of the spherical top end of the input pen, it can be prevented that the oscillation of the oscillated signal is disturbed by blocking the opening portions when the input pen touches the touch panel.

In order to achieve the above object, according to a fifteenth aspect of the invention, in addition to the configuration of the first invention, the input pen has a battery member that supplies a drive power to the signal oscillating means therein, a holder for holding the input pen is prepared, a charging member is built in the holder, and the battery member of the input pen is charged by the charging member when the input pen is held by the holder.

According to the touch panel device of the fifteenth invention, if the input pen is held in the pen holder when the input pen is not used, the battery member built in the input pen can be charged by the charging member built in the pen holder.

In order to achieve the above object, according to a sixteenth aspect of the invention, in addition to the configuration of the first invention, an oscillating signal absorbing member for absorbing the oscillated signal oscillated from the signal oscillating means is provided to edge portions of the touch panel.

According to the touch panel device of the sixteenth aspect of the invention, the oscillated signal, that reaches the edge portions of the touch panel other than the portion to which the sensing means is provided, out of the oscillated signal oscillated from the signal oscillating means in the input pen can be absorbed by the oscillated signal absorbing member without reflection. Therefore, the noises caused by there flected wave can be prevented from being detected by the sensing means, and thus the touch position can be identified with high precision.

In order to achieve the above object, according to a seventeenth aspect of the invention, in addition to the configuration of the first invention, the flat display device consists of a plasma display panel.

According to the touch panel device of the seventeenth aspect of the invention, the touch position of the input pen can be sensed on the display screen of the plasma display panel.

DETAILED DESCRIPTION OF THE PRESENT INVENTION

Preferred embodiments of the present invention will be explained with reference to the accompanying drawings hereinafter.

Figure 1:
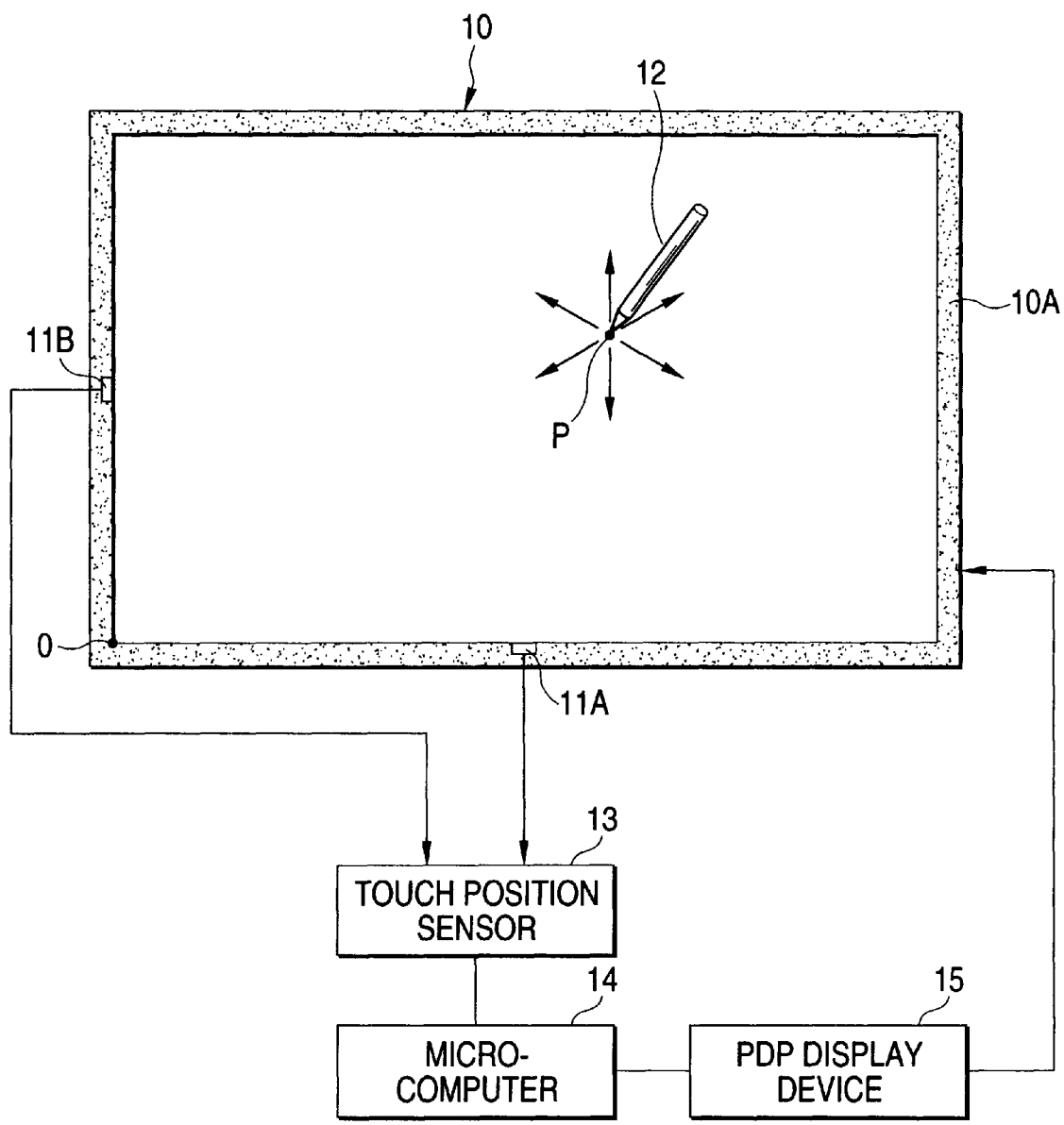
FIG. 1 is a view showing a configuration of an example in an embodiment of the present invention.

FIG. 1 is a view showing a configuration of a first example in the embodiment of the touch panel device according to the present invention.

In the following, explanation will be made while taking as an example the case where the touch panel device is fitted in front of the plasma display panel (abbreviated as "PDP" hereinafter). But the touch panel device may be fitted to the white board and the tablet in addition to PDP.

In FIG. 1, a front glass substrate of the PDP constitutes a touch panel 10 of the touch panel device. The touch panel device comprises two microphones 11A and 11B provided to a center position of a lower edge portion and a center position of a left-hand edge portion of a front surface of the touch panel 10 respectively; an input pen 12 built in a ultrasonic oscillator described later; and a touch position sensor 13 that is connected to two microphones 11A and 11B and senses a touch position on the touch panel 10 by the input pen 12 based on the ultrasonic wave which is input from the input pen 12 into the microphones 11A and 11B.

The touch position sensor 13 is connected to a microcomputer 14 such that a sensed signal of the touch position is output from the touch position sensor 13 to the microcomputer 14.

Then, the microcomputer 14 executes the screen display in response to the touch position on the touch panel 10 by the input pen 12 by outputting a control signal to the PDP display device 15, that is connected to the microcomputer 14, based on the sensed signal of the touch position input from the touch position sensor 13 to control the drive of the PDP display device 15.

A sound absorbing wall 10A that absorbs the ultrasonic wave is provided to a peripheral portion of touch panel 10 such that it buries the microphones 11A, 11B and it rises forward from the front surface of the touch panel 10.

Figure 2:
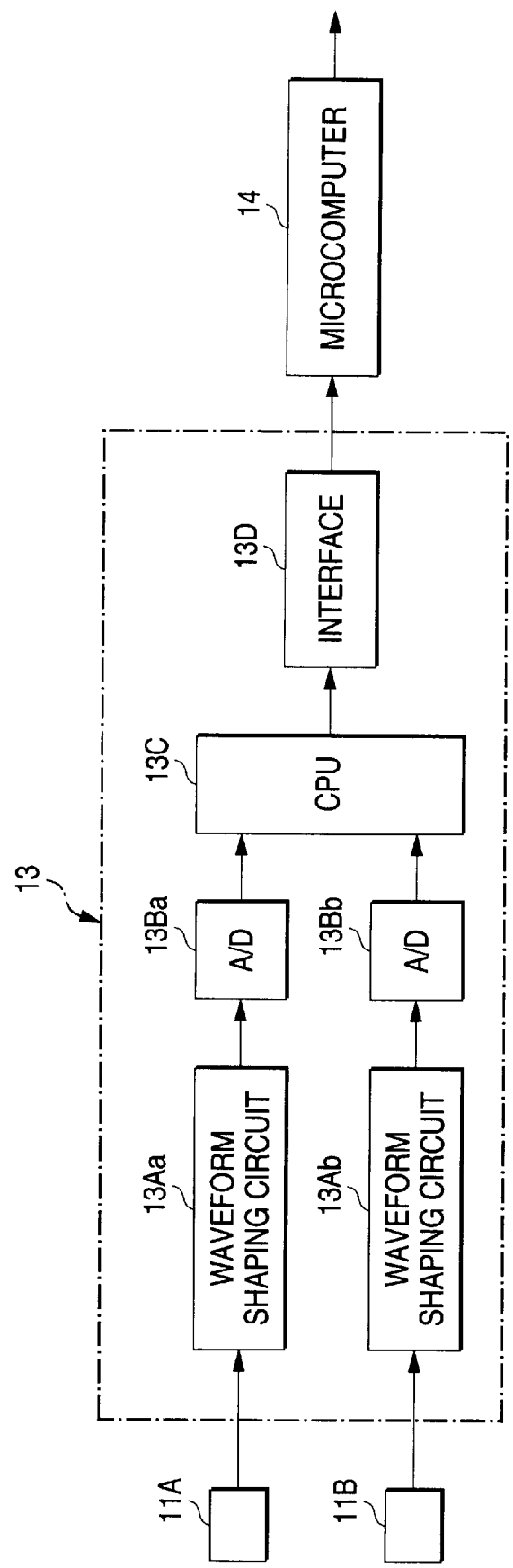
FIG. 2 is a block diagram showing a configuration of a pointing position sensor in the same example.

FIG. 2 is a block diagram showing a configuration of the touch position sensor 13.

In FIG. 2, the touch position sensor 13 comprises waveform shaping circuits 13Aa, 13Ab connected to the microphones 11A and 11B respectively to amplify/waveform-shape the sensed signal of the ultrasonic wave input from the microphones 11A and 11B; A/D converter circuits 13Ba, 13Bb connected to the waveform shaping circuits 13Aa, 13Ab respectively to A/D-convert the waveform-shaped signal output from the waveform shaping circuits 13Aa, 13Ab; a CPU 13C connected to the A/D converter circuits 13Ba, 13Bb to calculate coordinate values of a touch position P (see FIG. 1) based on the A/D converted signals of the ultrasonic wave being input from the A/D converter circuits 13Ba, 13Bb respectively; and an interface 13D for connection the CPU 13C and the microcomputer 14.

Figure 3:
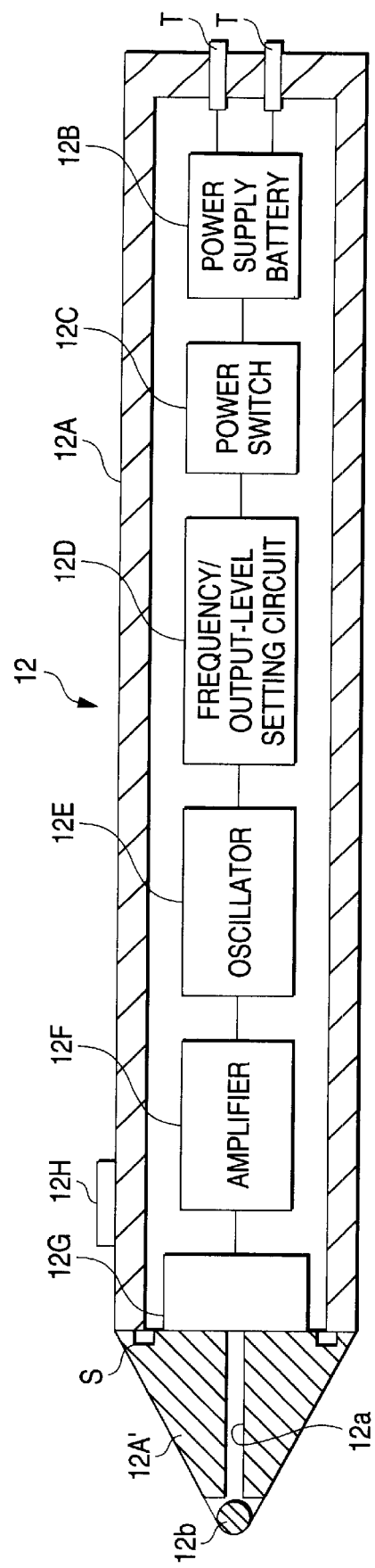
FIG. 3 is a side sectional view showing a configuration of an input pen in the same example.

FIG. 3 is a side sectional view showing a configuration of the input pen 12.

In FIG. 3, a casing 12A of the input pen 12 has a pen-like hollow shape whose pen point portion 12A' has a circular cone shape. A cylindrical hole 12a that extends along the axis direction and has a diameter of 1 mm is formed at the center portion of the pen point portion 12A'.

Figure 4:
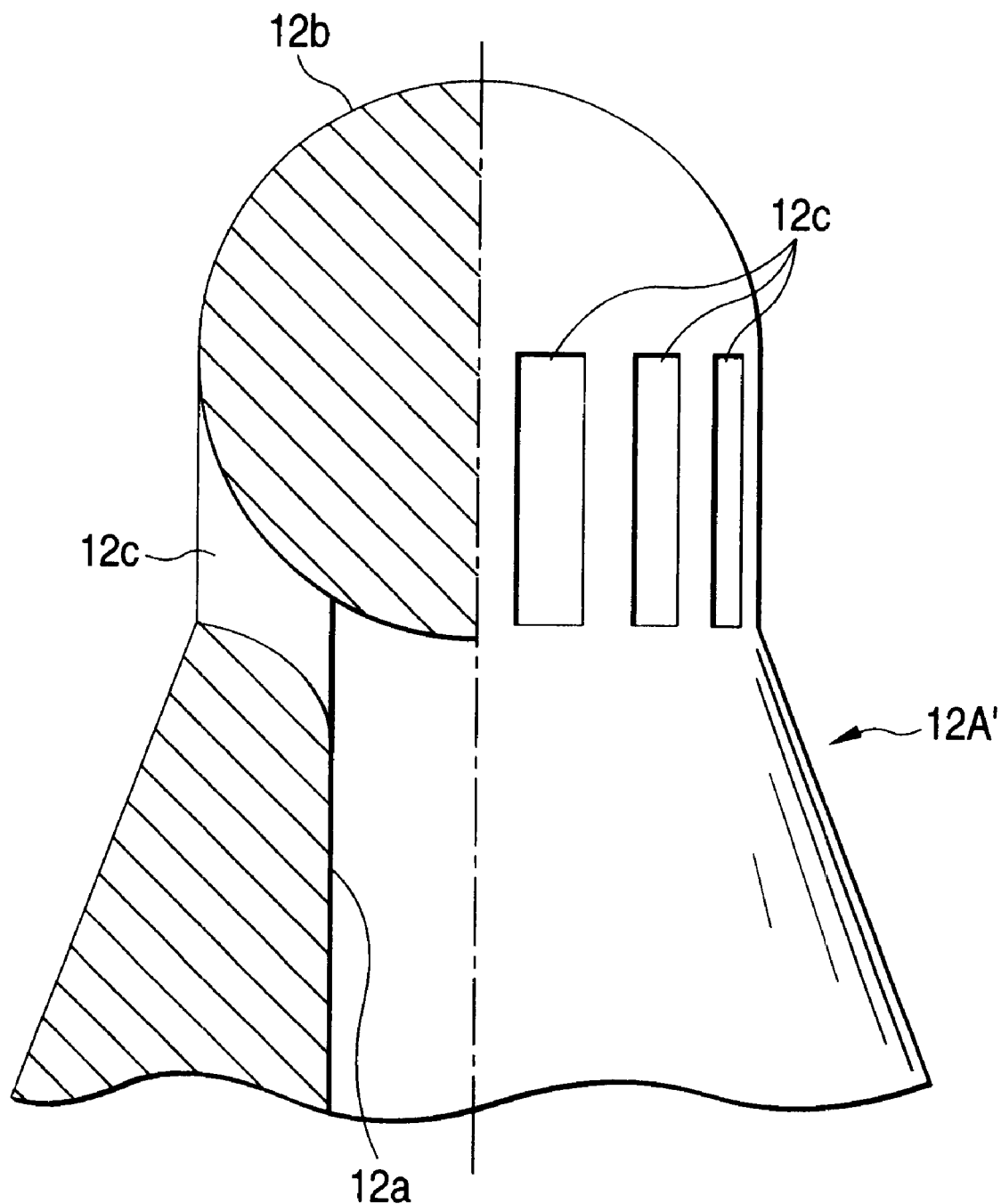
FIG. 4 is an enlarged view, one side of which is sectioned, showing a structure of a pen point portion of the input pen.

Then, as shown in FIG. 4 in an enlarged fashion, a ball portion 12b is formed integrally with the pen point portion 12A' of the casing 12A. The ball portion 12b faces to a top end opening portion of the cylindrical hole 12a. The cylindrical hole 12a is communicated to the outside via a plurality of opening portions 12c that are formed on an outer peripheral wall of the pen point portion 12A' at an equiangular interval so as to oppose to a rear portion of the ball portion 12b.

The ball portion 12b is formed of resin such as PET, nylon, Teflon, etc., or felt, etc., for example, not to damage a surface of the touch panel 10 when the pen point portion 12A' of the input pen 12 is brought into contact with the touch panel 10.

In FIG. 3, a power supply battery 12B, a power switch 12C, a frequency/output-level setting circuit 12D, an oscillator 12E, an amplifier circuit 12F, and a piezoelectric loudspeaker 12G consisting of a piezoelectric device are built in a main body of the casing 12A.

This piezoelectric loudspeaker 12G is fitted adjacent to the rear opening portion of the cylindrical hole 12a.

Also, a touch sensor S for sensing the fact that the ball portion 12b being formed at the top end of the pen point portion 12A' touches t he touch panel 10 is provide data connected portion between the pen point portion 12A' and the main body portion of the casing 12A. An LED 12H is provided on an outer peripheral surface of the main body portion.

In this case, a microswitch may used in place of the touch sensor S.

Further, a pair of charging terminals T connected to the power supply battery 12B are buried in a rear end surface of the casing 12A so as to expose their end portions from the outer surface.

Figure 5:
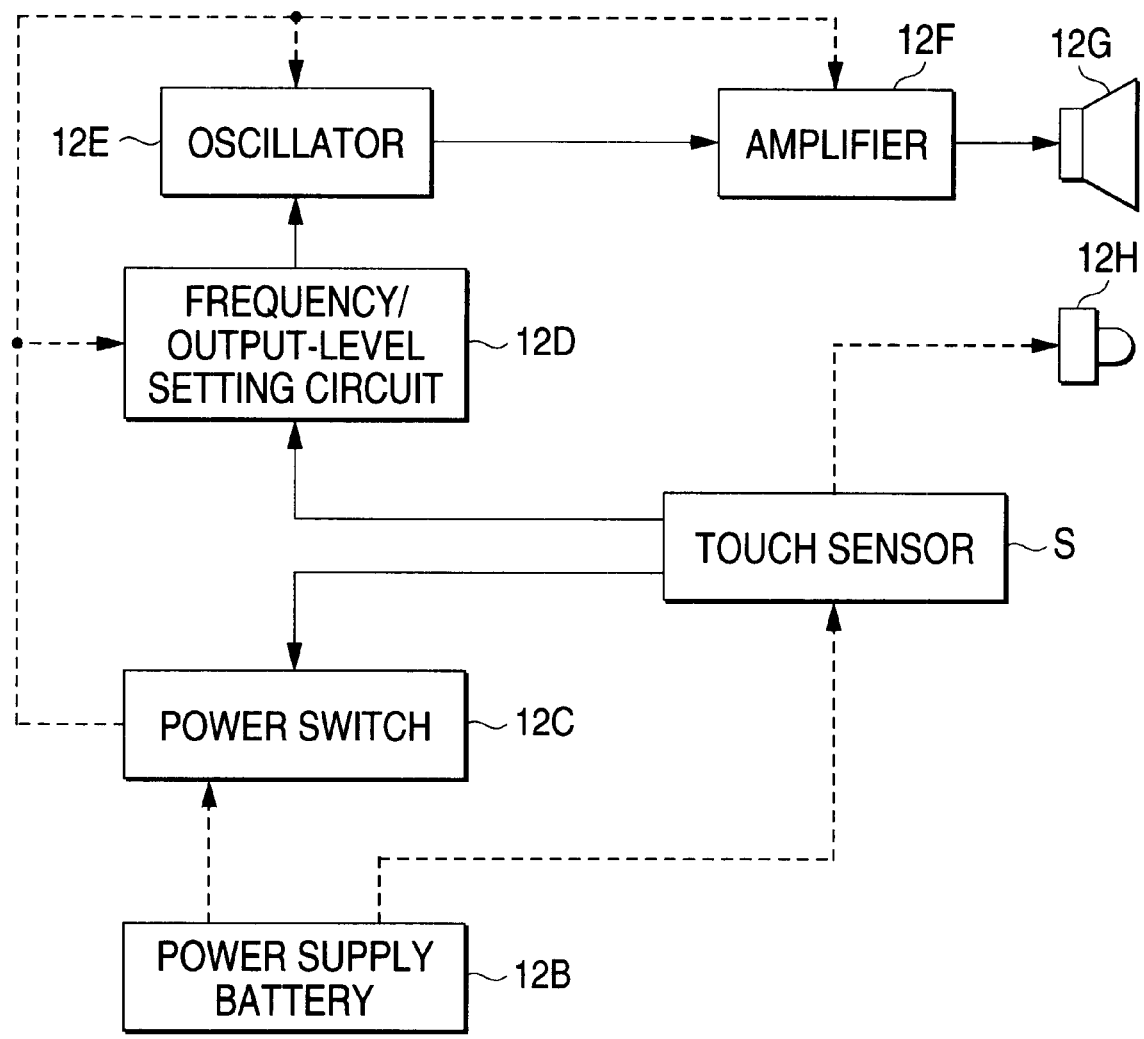
FIG. 5 is a block diagram showing an example of internal circuit connection of the input pen.

FIG. 5 is a block diagram showing internal circuit connection state of the input pen 12. In FIG. 5, a solid line denotes a power line, and a broken line denotes a signal/control line.

In FIG. 5, the power switch 12C is connected to the power supply battery 12B that is charged by a charger, described later, via the charging terminals T. In addition, the power is supplied to the frequency/output-level setting circuit 12D, the oscillator 12E, and the amplifier circuit 12F via the power switch 12C.

The frequency/output-level setting circuit 12D is connected to the oscillator 12E to set a frequency or output level of the ultrasonic signal being output from the oscillator 12E.

Then, the oscillator 12E is connected to the piezoelectric loudspeaker 12G via the amplifier circuit 12F. When the ultrasonic signal that is output from the oscillator 12E and then amplified by the amplifier circuit 12F is input into the piezoelectric loudspeaker 12G, the ultrasonic wave having the desired frequency or output level set by the frequency/output-level setting circuit 12D is oscillated into the cylindrical hole 12a of the casing 12A from the piezoelectric loudspeaker 12G (see FIG. 3).

The touch sensor S is connected to the power switch 12C. The touch sensor S turns ON the power switch 12C when it senses the event that the ball portion 12b at the top end portion of the casing 12A comes into contact with the touch panel 10, whereas the touch sensor S turns OFF the power switch 12C when the ball portion 12b does not touch the touch panel 10.

As the touch sensor S, there may be listed a pressure sensor, for example, which senses a pressure generated when the ball portion 12b of the pen point portion 12A' is pushed against the touch panel 10 and then turns ON the power switch 12C.

Then, the LED 12H is connected to the power switch 12C via the touch sensor S. When the touch sensor S senses that the ball portion 12b at the top end portion of the casing 12A touches the surface of the touch panel 10, the LED 12H as a light emitting device is turned ON by supplying the power from the power supply battery 12B.

Figure 6:
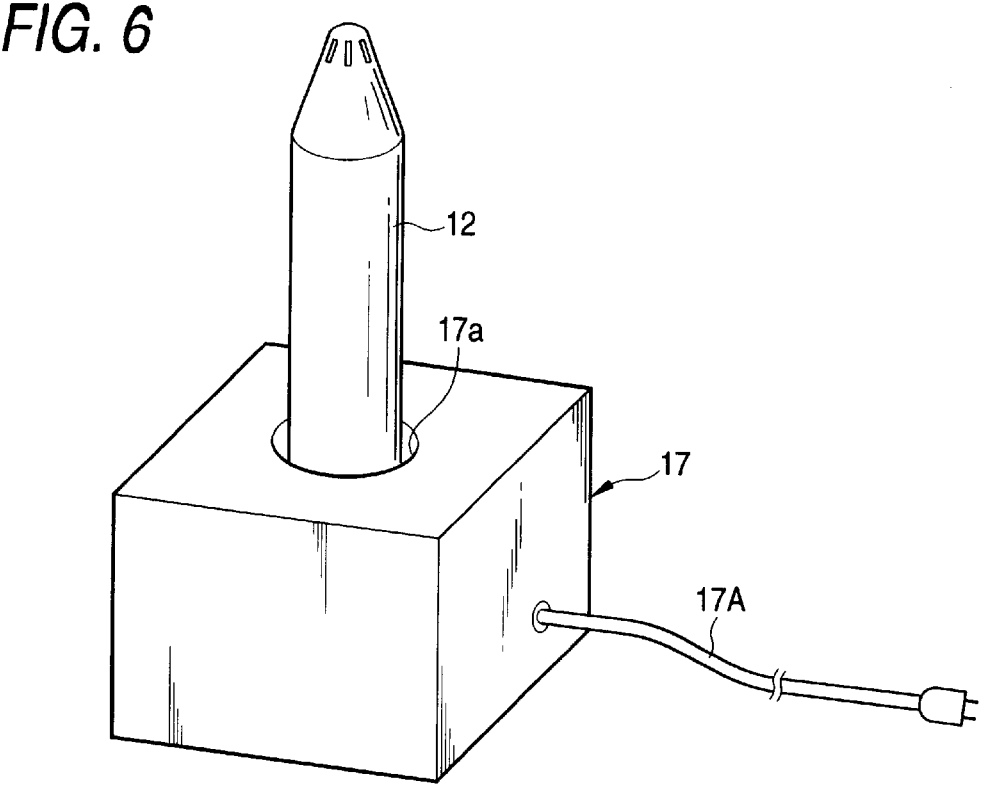
FIG. 6 is a perspective view showing a penholder to hold the input pen.

FIG. 6 is a perspective view showing the situation that the input pen 12 is held in a penholder 17.

In FIG. 6, a fitting hole 17a having an inner diameter that is slightly larger than an outer diameter of the casing 12A of the input pen 12 is formed vertically in a center portion of the penholder 17. The input pen 12 is held upright when the rear end portion of the input pen 12 is fitted into the fitting hole 17a.

Then, charging terminals (not shown) are formed at positions, which the charging terminals T provided to the rear end surface of the input pen 12 being fitted into the fitting hole 17a are brought into contact with, on a bottom surface of the fitting hole 17a of the penholder 17. A power cord 17A is connected to the charging terminals. Thus, the charging terminals are connected to an AC power supply via the power cord 17A.

Figure 7:
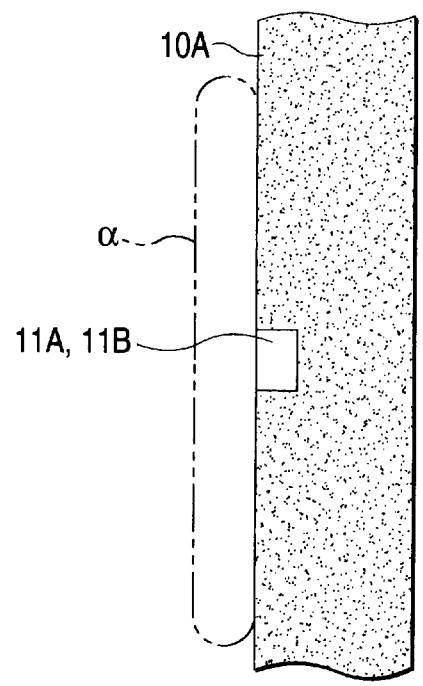
FIG. 7 is a view showing a fitting state of microphones in the same example.

FIG. 7 is a schematic view showing a fitting state of the microphones 11A, 11B.

The microphones 11A, 11B consists of a capacitor microphone, and are provided at a center position of a lower edge portion and a center position of a left-hand edge portion of the front surface of the touch panel 10. Thus, in order to have the directivity over the entire surface of the touch panel 10, the microphones 11A, 11B are buried in the sound absorbing wall 10A such that sound receiving surfaces are arranged to form a substantially equal surface to an inner wall surface of the sound absorbing wall 10A.

Accordingly, as shown by a chain double-dashed line α, the microphones 11A, 11B are set to have the 180° direction characteristic.

Next, a method of sensing the touch position on the touch panel by using the above touch panel device will be explained hereunder.

While the input pen 12 is fitted and held in the fitting hole 17a of the pen holder 17 that is connected to the AC power supply via the power cord 17A, the charging terminals provided to the bottom surface of the fitting hole 17a comes into contact with the charging terminals T provided to the rear end surface of the input pen 12, and thus the power supply battery 12B is charged (see FIG. 7).

Then, as shown in FIG. 1, when the pen point (the ball portion 12b of the pen point portion 12A') of the input pen 12 in which the power supply battery 12B has been charged touches any position (referred to as a "touch position" hereinafter) P of the touch panel 10, the touch sensor S senses the contact between the ball portion 12b and the touch panel 10 according to a contact pressure at that time.

Then, the LED 12H of the input pen 12 is turned ON when the current is supplied to the LED 12H from the power supply battery 12B since the touch sensor S is turned ON. Accordingly, the operator can see that the pen point of the input pen 12 has perfectly touched the touch panel 10.

At this time, because the opening portions 12c of the input pen 12 that oscillate the ultrasonic wave are formed at the rear position of the ball portion 12b, the opening portions 12c are never blocked by the touch of the input pen 12 onto the touch panel 10 and thus the oscillation of the ultrasonic wave is in no way disturbed.

The power switch 12C is turned ON when the touch sensor S is turned ON. Then, the power is supplied from the power supply battery 12B to the frequency/output-level setting circuit 12D, the oscillator 12E, and the amplifier circuit 12F respectively.

Accordingly, the oscillator 12E generates the ultrasonic signal having the frequency or the output level being set by the frequency/output-level setting circuit 12D, and then outputs it to the amplifier circuit 12F. The amplifier circuit 12F amplifies the ultrasonic signal, and then outputs it to the piezoelectric loudspeaker 12G.

Then, the piezoelectric loudspeaker 12G outputs the ultrasonic wave having the predetermined oscillation frequency (e.g., 20 to 100 KHz) based on the ultrasonic signal being input from the amplifier circuit 12F. The ultrasonic wave oscillated from the piezoelectric loudspeaker 12G is passed through the cylindrical hole 12a of the casing 12A and is then oscillated from a plurality of opening portions 12c formed on the outer peripheral surface of the pen point portion 12A'.

At this time, since the opening portions 12c are formed on the outer peripheral surface of the pen point portion 12A' at the equiangular interval, the ultrasonic wave is oscillated around the penholder of the input pen 12 over 360° and is spread toward the outer edge portion along the surface of the touch panel 10.

Then, the ultrasonic wave oscillated from the input pen 12 is sensed by the microphones 11A and 11B that are provided at the center position of the lower edge portion and the center position of the left-hand edge portion of the touch panel 10 respectively.

At this time, the microphones 11A and 11B have the direction characteristic of 180° as described above. Therefore, everywhere the input pen 12 touches the touch panel 10, the microphones 11A and 11B can sense the ultrasonic wave oscillated from the input pen 12.

When the ultrasonic wave is sensed by the microphones 11A and 11B, the microphones 11A and 11B output the ultrasonic sensed signal based on the sensed ultrasonic wave to the touch position sensor 13 respectively.

As shown in FIG. 2, the ultrasonic sensed signal being input into the touch position sensor 13 is input into the waveform shaping circuit 13A$a$, 13A$b$ respectively, and then amplified and waveform-shaped by the waveform shaping circuit 13A$a$, 13A$b$, and then A/D-converted by the A/D converter circuits 13B$a$, 13B$b$, and then input into the CPU 13C.

Then, the CPU 13C executes the calculation to identify the cooperation of the touch position P, based on a digital ultrasonic sensed signal being output from the A/D converter circuits 13B$a$, 13B$b$.

In order to identify the coordinate of the touch position P, the calculation is carried out in the CPU 13C by calculating distances from the microphones 11A, 11B to the touch position P and then calculating the coordinate value of the touch position P by setting the lower left-hand corner O of the touch panel 10 as an origin, for example.

The calculation of the distances from the microphones 11A, 11B to the touch position P will be performed by the following method. That is, a first method is a calculation method that is performed based on a level of the ultrasonic wave sensed by the microphones.

The level of the ultrasonic wave obtained when the ultrasonic wave reaches the microphones 11A, 11B is reduced lower than a level obtained when the ultrasonic wave is oscillated from the input pen 12, in response to the distance between the microphones 11A, 11B and the touch position P. For this reason, the distance to the touch position P is calculated based on the level reduction rate obtained by comparing the constant level of the ultrasonic wave that is oscillated from the input pen 12 with respective levels of the ultrasonic waves that are sensed by the microphones 11A, 11B.

Also, distances to the touch position P may be calculated based on a resultant ratio by comparing levels of the ultrasonic waves that are sensed by the microphones 11A, 11B respectively.

A second method is a calculation method that is performed based on phase of the ultrasonic wave sensed by the microphones 11A, 11B respectively.

The second method calculates the distances to the touch position P based on respective phases of the ultrasonic waves that are sensed by the microphones 11A, 11B.

Figure 8:
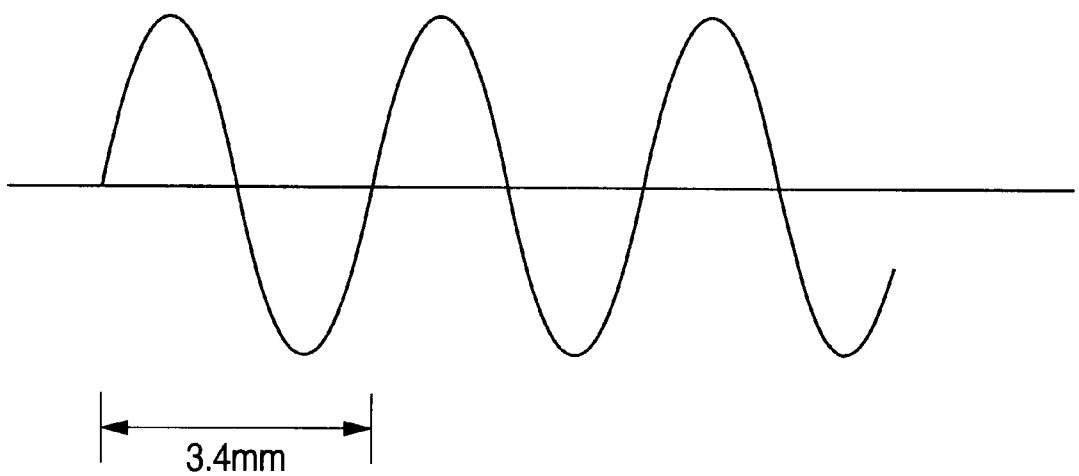
FIG. 8 is a waveform view showing a ultrasonic wave.

For example, in FIG. 8 showing a waveform of the ultrasonic wave, if the frequency of the ultrasonic wave oscillated from the input pen 12 is 100 KHz, a length of one period of the ultrasonic wave becomes 3.4 mm because the acoustic velocity is 340 mm/sec.

Accordingly, the distance to the touch position P can be calculated by detecting to which phase in which period of the ultrasonic wave the phase that have reached the microphones 11A, 11B respectively corresponds.

A third method is a calculation method that is performed based on phase difference generated between the ultrasonic waves sensed by the microphones 11A, 11B when the input pen 12 is moved on the touch panel.

The third method previously detects the phase of the ultrasonic wave oscillated from a designated position after any position on the touch panel 10 is designated previously by the operator, then compares the phase of the ultrasonic wave oscillated from the designated position with the phase of the ultrasonic wave oscillated from the touch position of the input pen different from the designated position, and then calculates the distance to the touch position by detecting the phase displacement therebetween.

Figure 9:
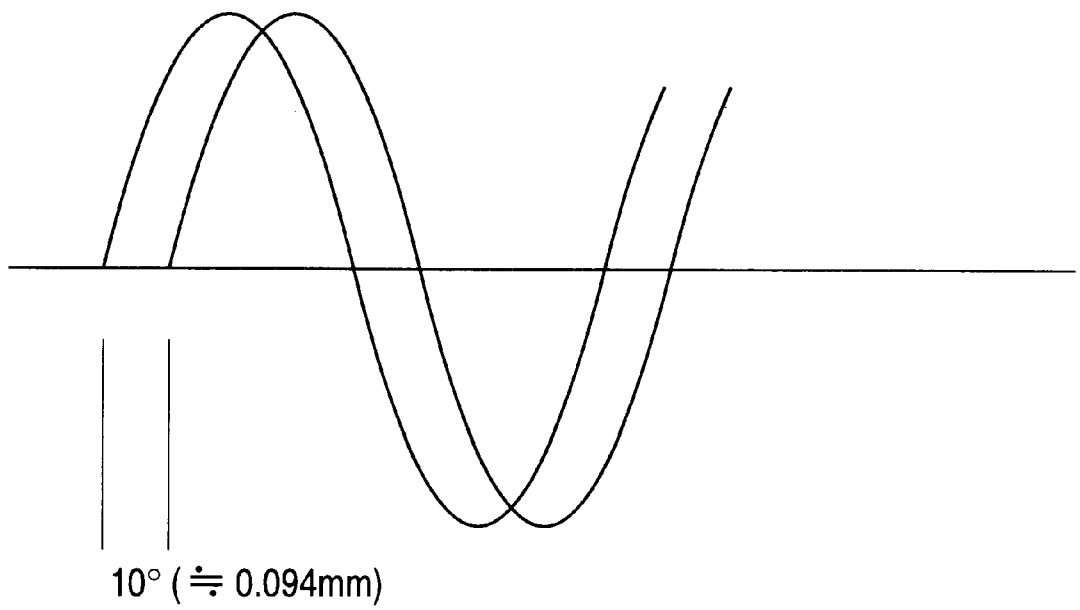
FIG. 9 is a waveform view showing a phase displacement of the ultrasonic wave.

More particularly, in FIG. 8, as mentioned above, if the frequency of the ultrasonic wave oscillated from the input pen is 100 KHz, a length of one period of the ultrasonic wave becomes 3.4 mm because the acoustic velocity is 340 mm/sec. Hence, as shown in FIG. 9, if a phase different in the ultrasonic waves that are sensed between the first touch position and the moved touch position is given as 10°, a distance of the input pen at the touch position on the touch panel from the designated position is given by:

$$3.4 \text{ mm} \times 10/360 \approx 0.094 \text{ mm}.$$

Accordingly, the distance between the touch position P and the microphones 11A, 11B can be calculated based on the distance between the calculated touch position and the designated position.

A fourth method is a calculation method using the Doppler effect of the ultrasonic wave being oscillated from the input pen.

The fourth method designates previously any position on the touch panel 10 to detect the distance between this designated position and the microphones 11A, 11B, then detects a moving velocity and the moving direction of the touch position P based on the Doppler effect generated when the input pen 12 is moved from the designated position on the touch panel 10, and then calculates the distances between the touch position P and the microphones 11A, 11B after the movement.

After the touch position sensor 13 calculates respective distances between the touch position P and the microphones 11A, 11B according to any one method, it performs the calculation of the coordinates (X, Y) of the touch position P.

Figure 10:
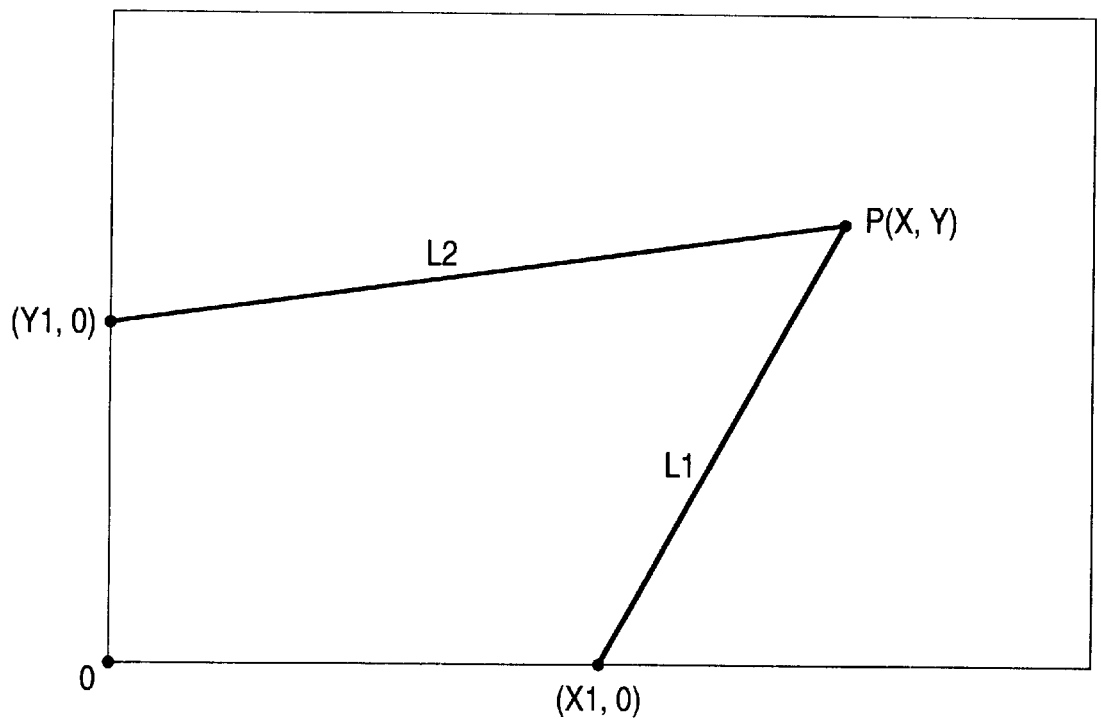
FIG. 10 is a view showing a method of calculating a distance to a touch position.

That is, as shown in FIG. 10, assumed that the lower left-hand corner portion o of the touch panel 10 is set as the origin, the coordinates of the fitted position of the microphones 11A, 11B are set as (X1,0), (0,Y1) respectively, and the distances from the microphones 11A, 11B to the touch position P are set as L1, L2 respectively, then $$L1^2 = (X-X1)^2 + Y^2$$

$$L2^2 = X^2 + (Y-Y1)^2$$

are given. Values of the coordinates (X,Y) of the touch position P can be calculated by solving the simultaneous equation.

Data of the coordinates (X,Y) of the touch position P calculated in this manner are output from the touch position sensor 13 to the microcomputer 14 via the interface 13D

Then, the microcomputer 14 searches image data corresponding to the coordinates (X,Y) of the touch position P from the database in which the image data are stored previously, and then outputs the image data signal to the PDP display device 15. Then, the PDP display device 15 displays the desired images, e.g., the moving locus of the touch mark or the touch position, on the screen of the PDP based on the image data signal.

In the above example, the touch position is identified by using the ultrasonic wave. But the AM- or FM-modulated signal may be used, otherwise the intermittent wave may be used.

Also, in the above example, the microphones 11A and 11B are provided at the center position of the lower edge portion and the center position of the left-hand edge portion of the touch panel 10 respectively. Even though the microphones 11A and 11B are arranged at any places, the coordinates (X,Y) of the touch position P can be identified, like the above, if such microphones 11A and 11B are arranged at different positions on the edge portions of the touch panel 10.

Figure 11:
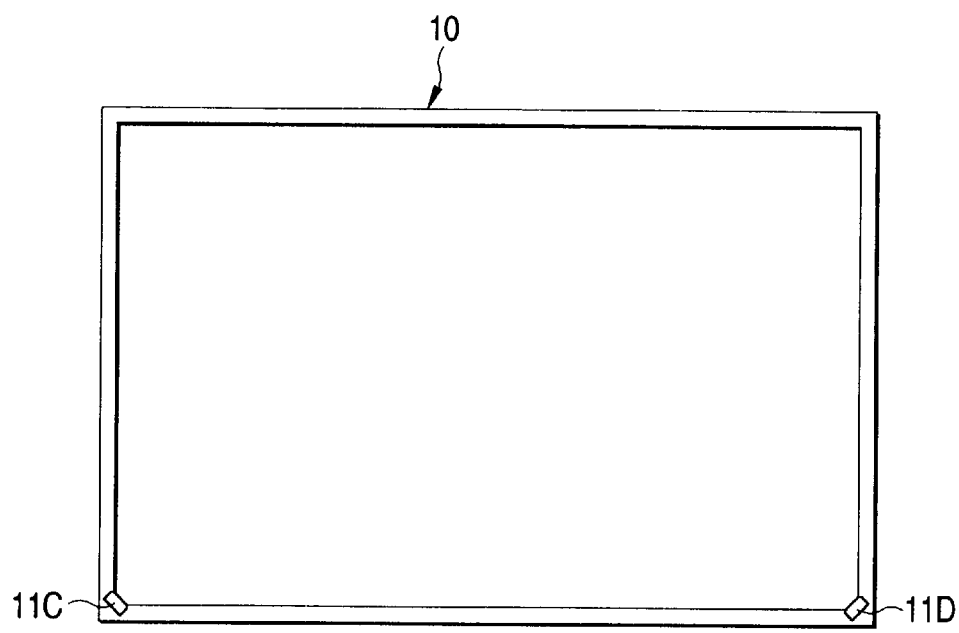
FIG. 11 is a view showing another example of arrangement of the microphones.

FIG. 11 is a view showing an arrangement example in which a pair of microphones are placed on the corners of the touch panel respectively.

In FIG. 11, the microphones 11C and 11D are arranged at the lower left-hand corner portion and the lower right-hand corner portion of the touch panel 10 respectively. But they may be arranged on other corners.

Figure 12:
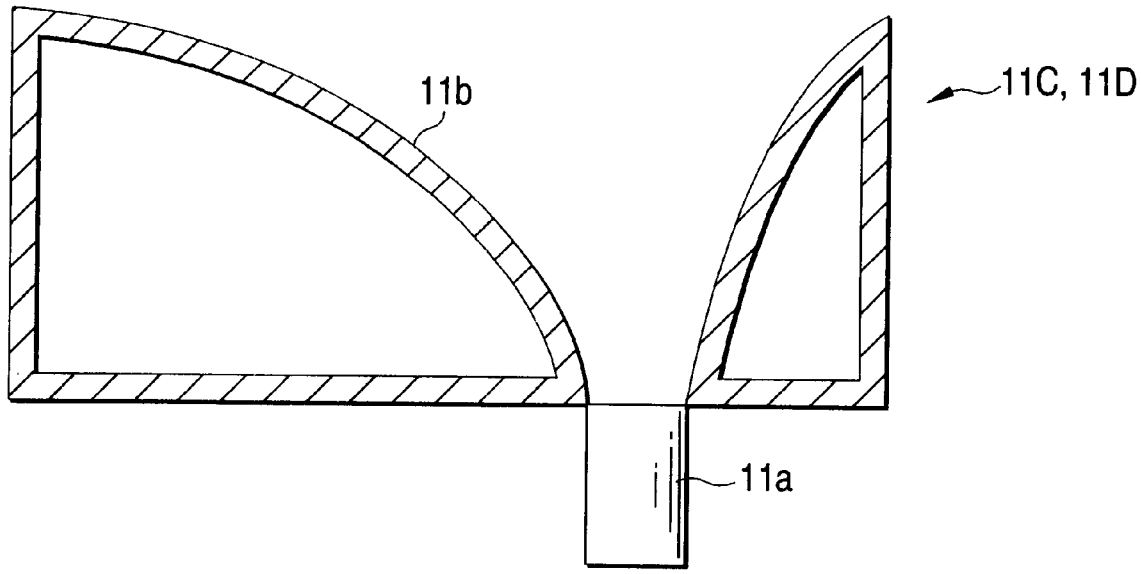
FIG. 12 is a side sectional view showing a configuration of the microphones that have a direction characteristic of 90 degree.
Figure 13:
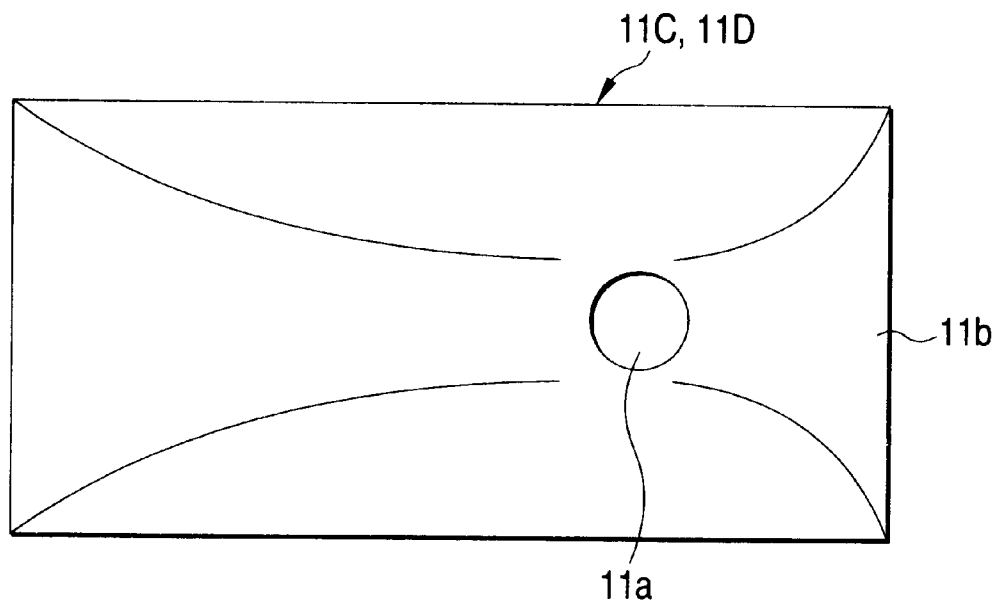
FIG. 13 is a front view showing the microphone.

If the microphones 11C, 11D are arranged on the corner portions of the touch panel 10, like this example, the microphone that has a directivity of 90 degree, as shown in FIG. 12 and FIG. 13, are used as the microphones 11C, 11D.

That is, in the microphones 11C, 11D, a horn 11*b* that forms the directivity of 90 degree is provided to a front portion of a capacitor microphone 11*a*.

Figure 14:
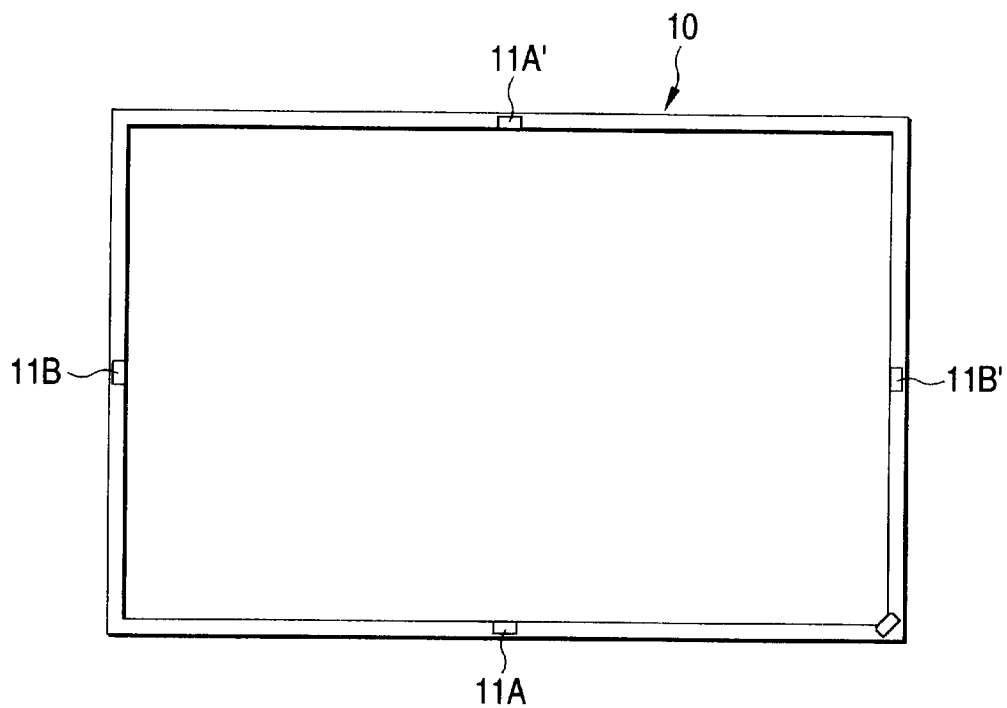
FIG. 14 is a view showing still another example of arrangement of the microphone.
Figure 15:
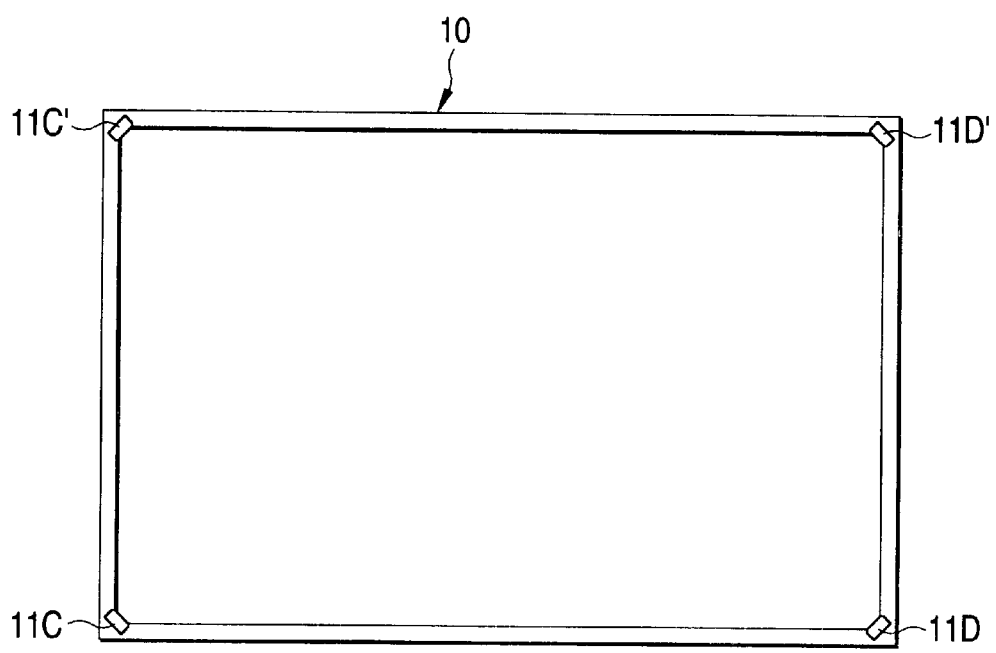
FIG. 15 is a view showing still another example of arrangement of the microphone.
Figure 16:
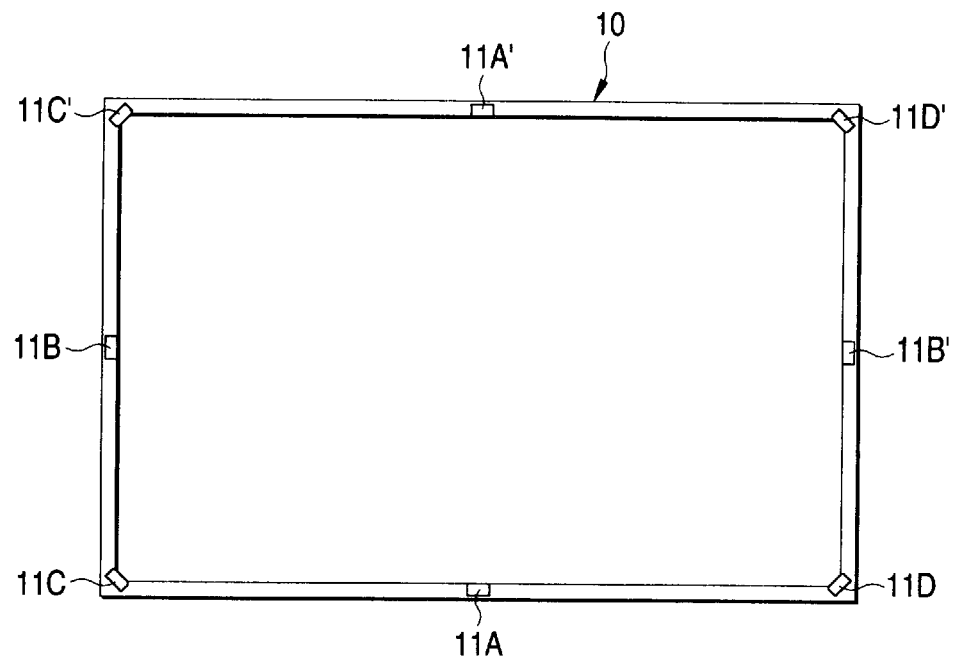
FIG. 16 is a view showing still another example of arrangement of the microphone.

FIGS. 14 to 16 show an arrangement example in which three microphones or more are arranged on the touch panel 10 respectively.

In other words, FIG. 14 shows an arrangement example in which four microphones 11A, 11B, 11A', 11B' that have the directivity of 180 degree are arranged at center positions of four sides of the touch panel 10 respectively. FIG. 15 shows an arrangement example in which four microphones 11C, 11D, 11C', 11D' that have the directivity of 90 degree are arranged on four corner portions of the touch panel 10 respectively. FIG. 16 shows an arrangement example in which eight microphones, i.e. four microphones 11A, 11B, 11A', 11B' that have the directivity of 180 degree and four microphones 11C, 11D, 11C', 11D' that have the directivity of 90 degree, are arranged in total at the center positions of four sides and on four corner portions of the touch panel 10 respectively.

In this manner, in case three microphones or more are arranged on the touch panel, the coordinates of the touch position can be identified by selecting two signals on which no noise is superposed from the ultrasonic signals detected by these microphones, calculating the average of calculated values of the coordinate based on the ultrasonic signals detected by every two microphones that are selected according to permutation/combination, selecting two ultrasonic signals detected by two microphones that are closest to the touch position, or the like.

As described above, if the coordinates of the touch position are identified based on the ultrasonic signals detected by three microphones or more, the improvement in the detection precision can be achieved.

In case the microphones are arranged at the center positions of the edge portions of the touch panel, such microphones may have the directivity of 180 degree. Therefore, this case has such an advantage that a configuration of the microphone can be simplified rather than the case where the microphones are constructed to have the directivity of 90 degree when they are arranged on the corner portions. In addition, in case the microphones are arranged on the corner portions of the touch panel, it seems that the microphones seldom disturbs the display image and also the input pen hardly touches the corner portions of the touch panel. Therefore, this case has such an advantage that the touch position can be sensed without fail.

Figure 17:
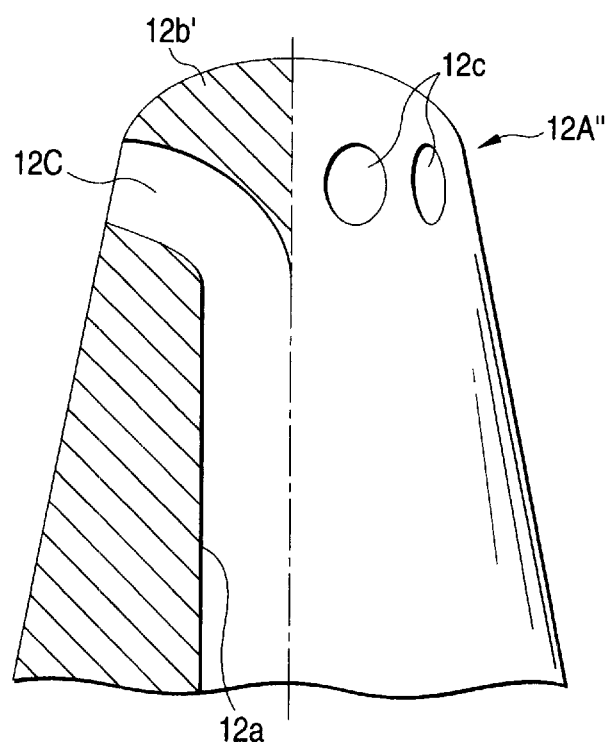
FIG. 17 is an enlarged view, one side of which is sectioned, showing another structure of a pen point portion of the input pen.

FIG. 17 is an enlarged view showing another example of a structure of a pen point portion (pen point) of the input pen, while sectioning one side of the view.

In FIG. 17, a top end surface 12*b*' of the pen point portion 12A' of the input pen is formed like a hemispherical shape. A plurality of circular opening portions 12*c*' that enable the cylindrical hole 12*a* to communicate with the outside are formed on a rear outer peripheral surface of the hemispherical top end surface 12*b*' at an equiangular interval.

In the input pen in this example, like the case of the pen point of the input pen shown in FIG. 4, when the pen point touches the touch panel, there is no possibility that the opening portions 12*c*' are blocked and thus the ultrasonic wave passed through the cylindrical hole 12*a* is oscillated without fail to the outside via the opening portions 12*c*'.

Figure 18:
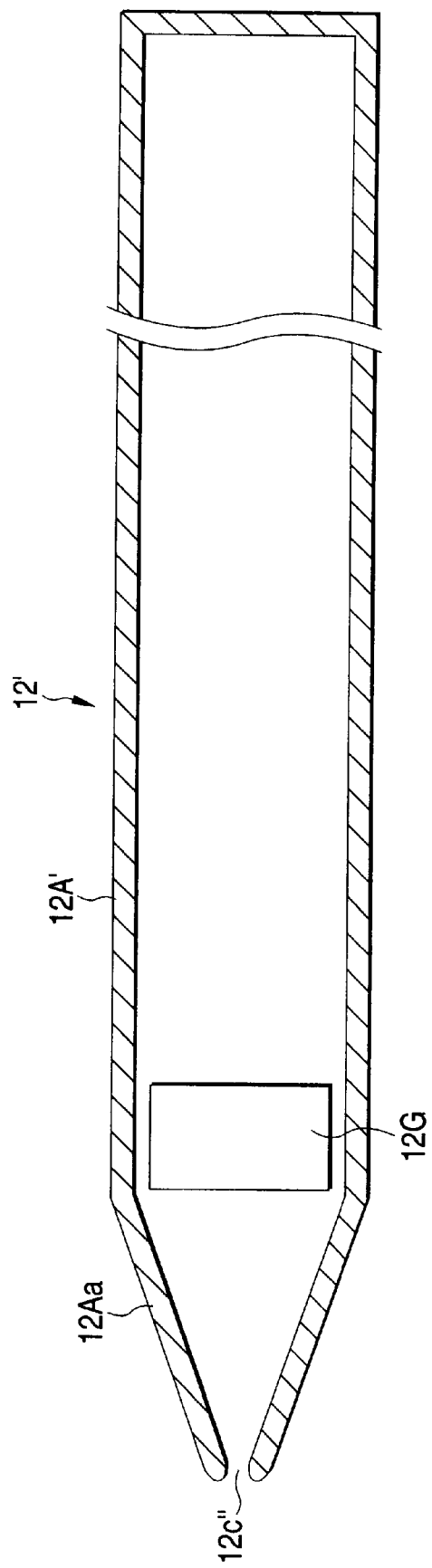
FIG. 18 is a side sectional view showing another configuration of a casing of the input pen.

FIG. 18 is a sectional view showing another example of a configuration of the input pen.

In FIG. 18, the casing 12A' of the input pen 12' is formed like a circular cone shape such that an inner diameter of an inner wall surface of the pen point portion 12A*a* is reduced smaller toward the to pend side. An opening 12*c*' whose diameter is 1 mm is formed at the top end.

Since the inner wall surface of the pen point portion 12A*a* of the input pen 12' has the circular cone shape, the ultrasonic wave that is oscillated from the piezoelectric loudspeaker 12G built in the casing 12A' through the opening 12*c*' has non-directivity.

Figure 19:
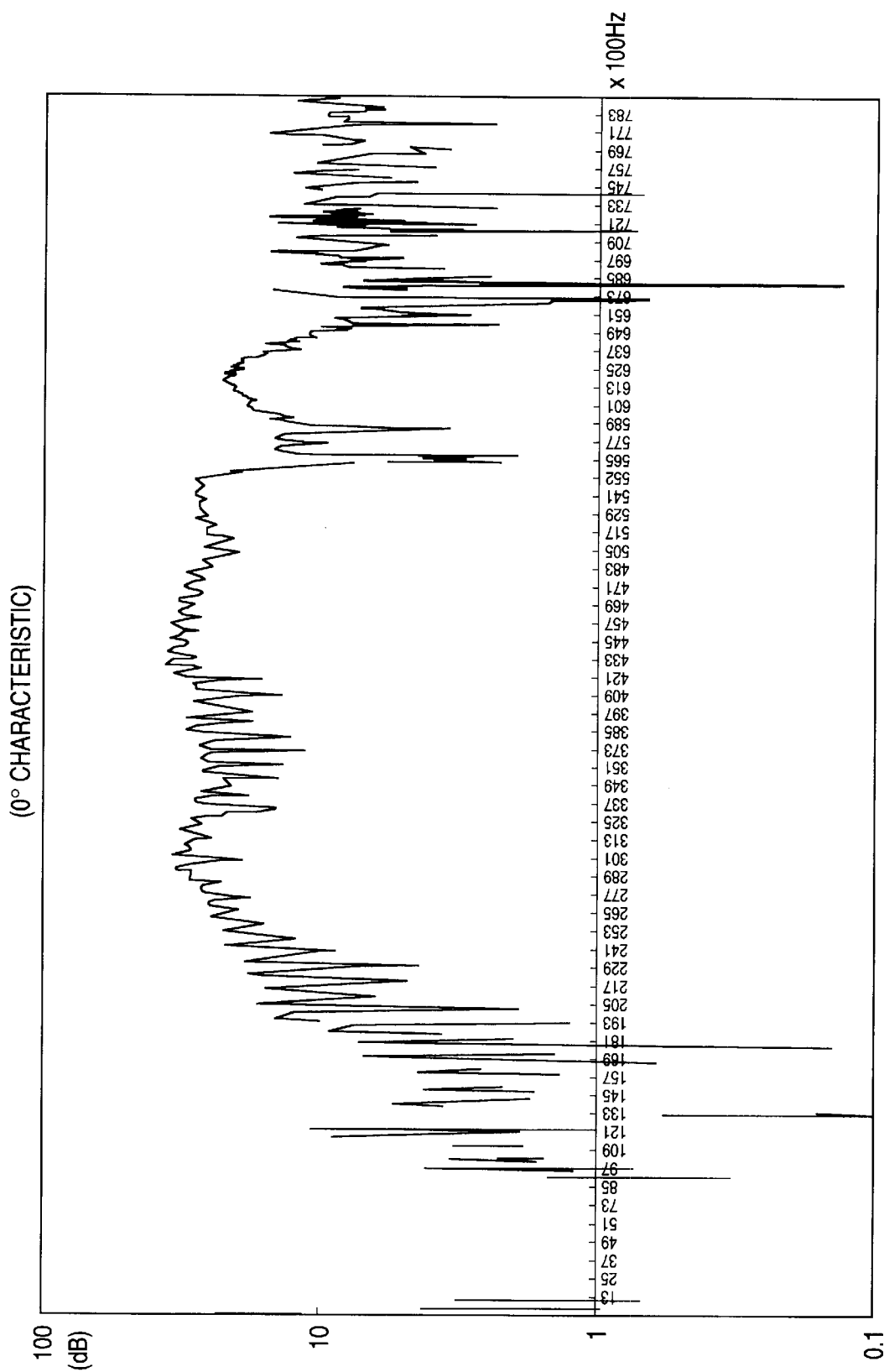
FIG. 19 is a view showing a 0° characteristic of the ultrasonic wave that is oscillated from the input pen in FIG. 18.
Figure 20:
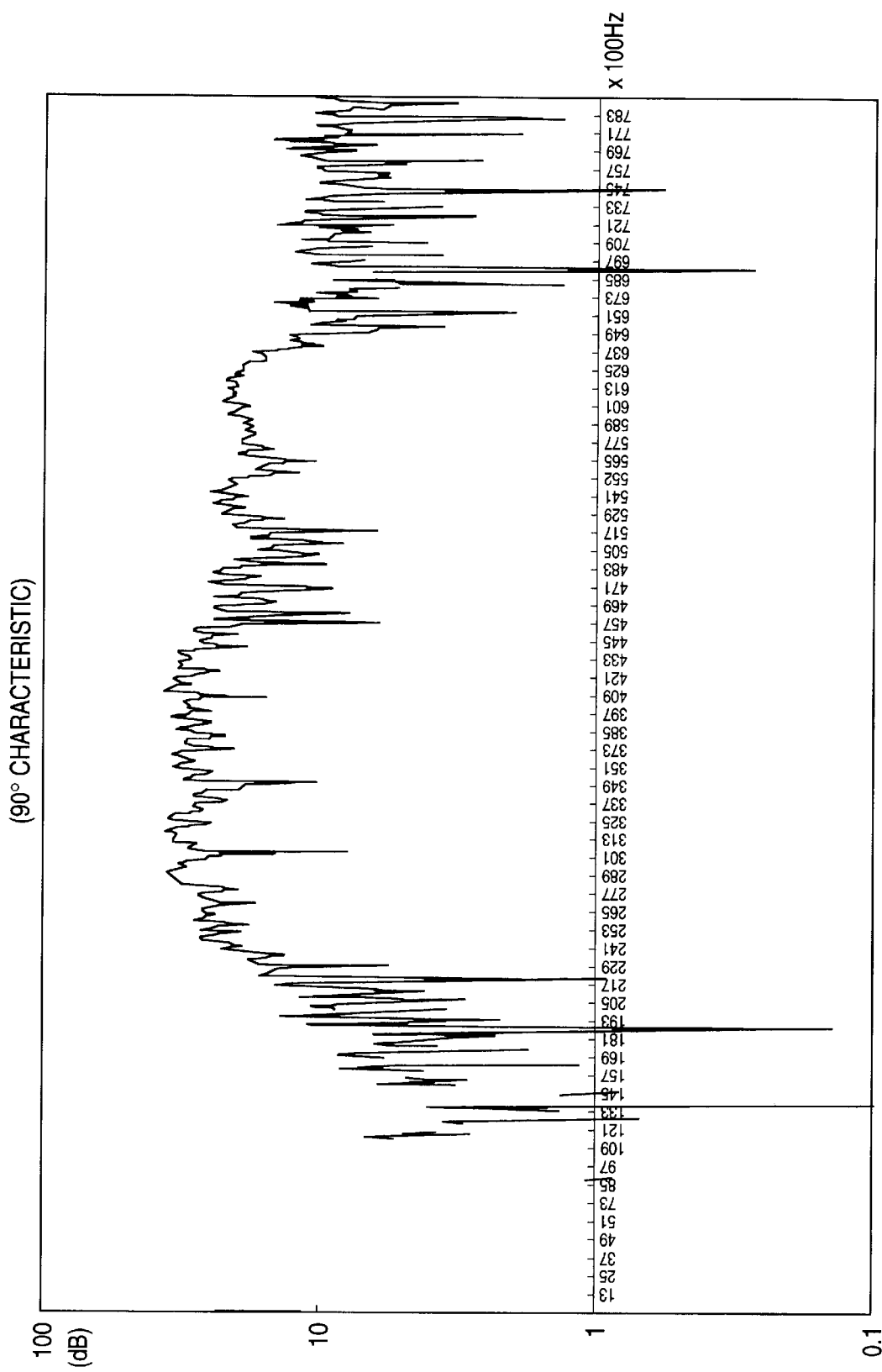
FIG. 20 is a view showing a 90° characteristic of the ultrasonic wave that is oscillated from the input pen in FIG. 18.

FIG. 19 is a graph showing an f-characteristic (0 degree characteristic) of the ultrasonic wave that is oscillated along the axis line direction of the casing 12A' out of the ultrasonic waves oscillated from the opening 12*c*" of the input pen 12'. FIG. 20 is a graph showing an f-characteristic (90 degree characteristic) of the ultrasonic wave that is oscillated in the perpendicular direction to the axis line of the casing 12A'.

Figure 21:
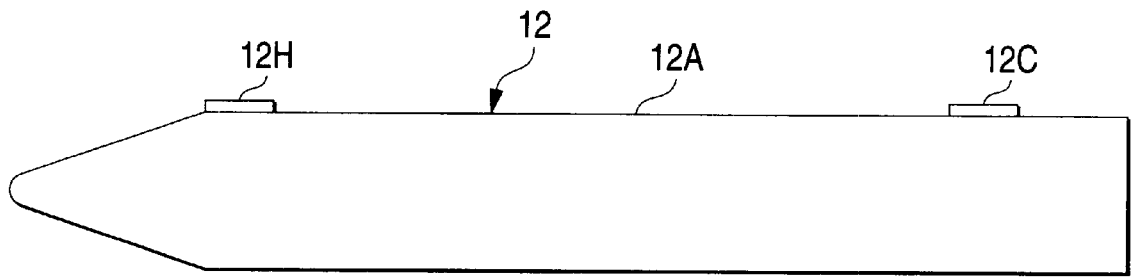
FIG. 21 is a side view showing another configuration of the input pen.

FIG. 21 is a side view showing another configuration of the input pen 12 in FIG. 3.

In this example, the power switch 12C is provided to the outer peripheral surface of the casing 12A as the externally provided type. The internal circuit connection is similar to the example in FIG. 5.

Since the power switch 12C in the input pen 12 of this example is externally provided, this power switch 12C can be used as the main switch. Thus, ON/OFF of the power supply can be executed by operating this power switch 12C by the finger.

Figure 22:
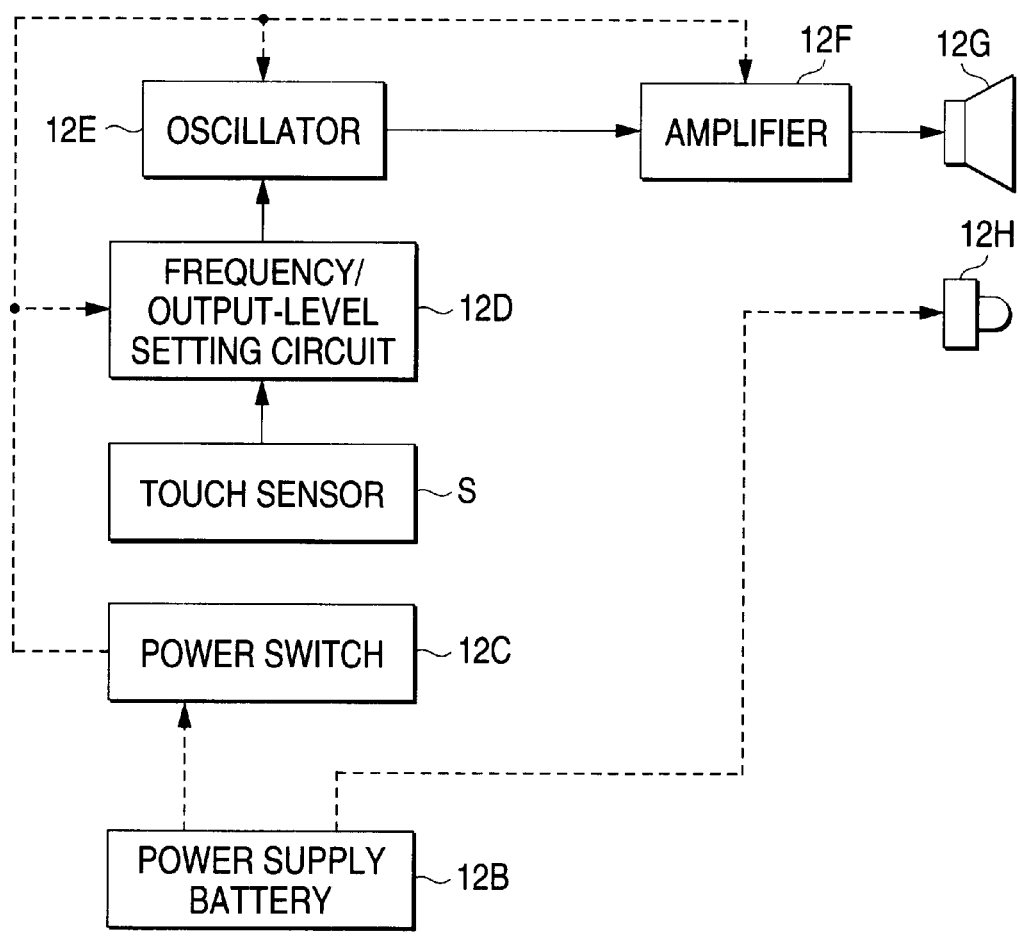
FIG. 22 is a block diagram showing another example of internal circuit connection of the input pen.

FIG. 22 is a block diagram showing still another connection state of the internal circuit of the input pen 12 in FIG. 3.

In this example, like the example in FIG. 21, the power switch 12C is provided to the outer peripheral surface of the casing 12A as the externally provided type. But the touch sensor S is connected only to the frequency/output-level setting circuit 12D, and ON/OFF of the power supply is performed only by the power switch 12C.

In the connection example of the internal circuit shown in FIG. 5 and FIG. 22 described above, the touch sensor S senses the contact pressure or the number of contact times between the pen point of the input pen and the touch panel, and then outputs the sensed signal to the frequency/output-level setting circuit 12D. Then, the frequency/output-level setting circuit 12D changes the set value of the frequency and the output level of the ultrasonic wave generated by the oscillator 12E, in response to the sensed signal from the touch sensor S.

Then, after the frequency or the output level of the ultrasonic wave is set in answer to the contact pressure and the number of contact times between the pen point of the input pen and the touch panel, when the microphones sense the ultrasonic wave having the set frequency or output level, the touch position sensor 13 (see FIG. 1) outputs a command signal to the microcomputer 14 to display the image that is previously set correspondingly.

For example, the correspondence between the frequency of the ultrasonic wave set by the frequency/output-level setting circuit 12D and the image displayed on the touch panel may be set such as:

100 kHz—thick line red
90 kHz—thin line red
80 kHz—thick line black
70 kHz—thin line black, or the frequency may be set to display other color line, or the frequency may be set to display the solid line and the dotted line.

For example, line drawings using various colors may be depicted on the screen of PDP by setting attributes between the frequency or the output level of the ultrasonic wave as above and the display image at the touch position by the input pen.

Figure 23:
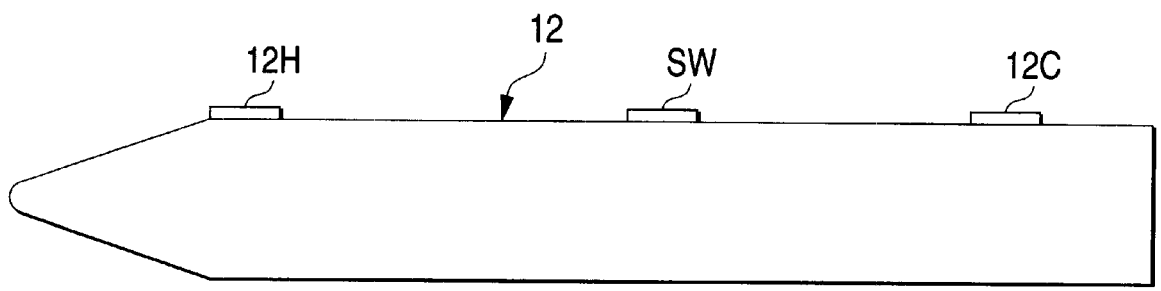
FIG. 23 is a side view showing still another configuration of the input pen.
Figure 24:
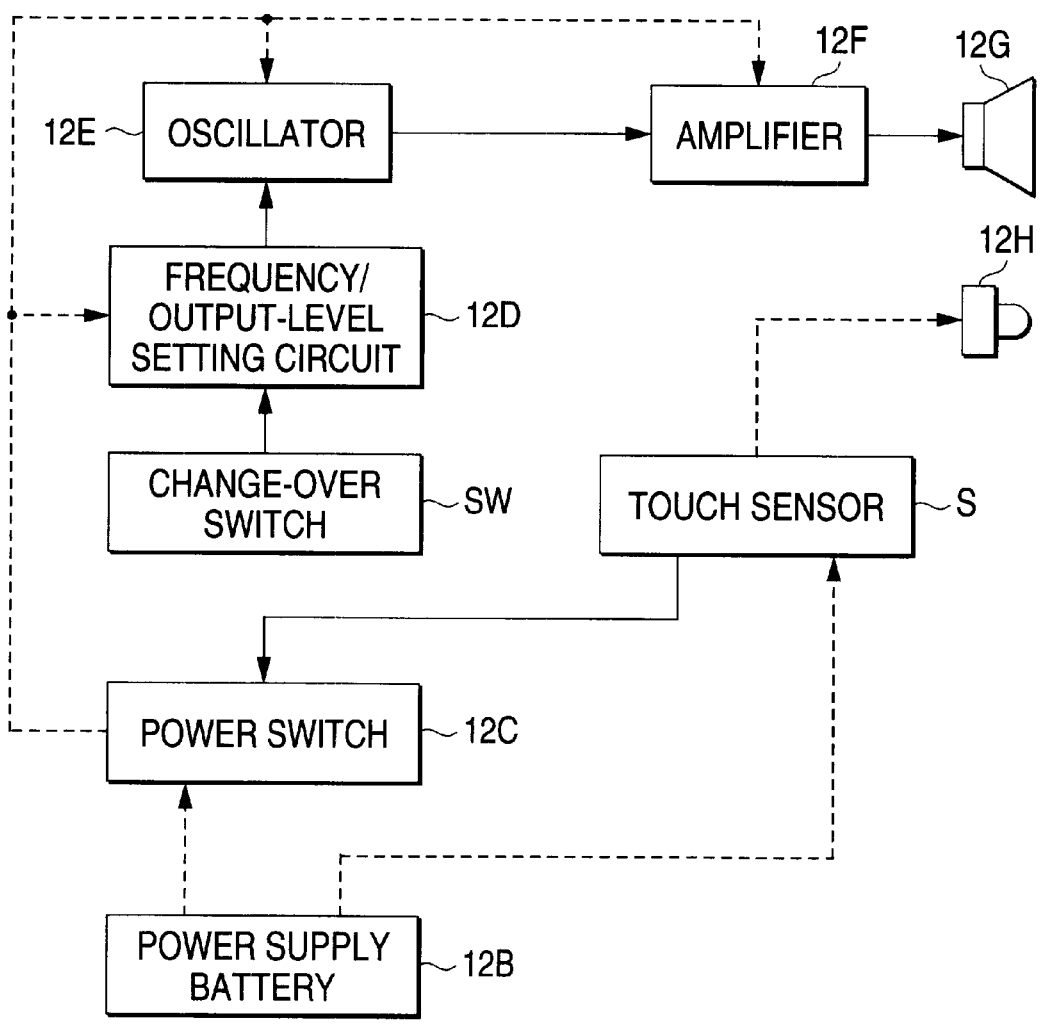
FIG. 24 is a block diagram showing another example of internal circuit connection of the input pen in FIG. 23.
Figure 25:
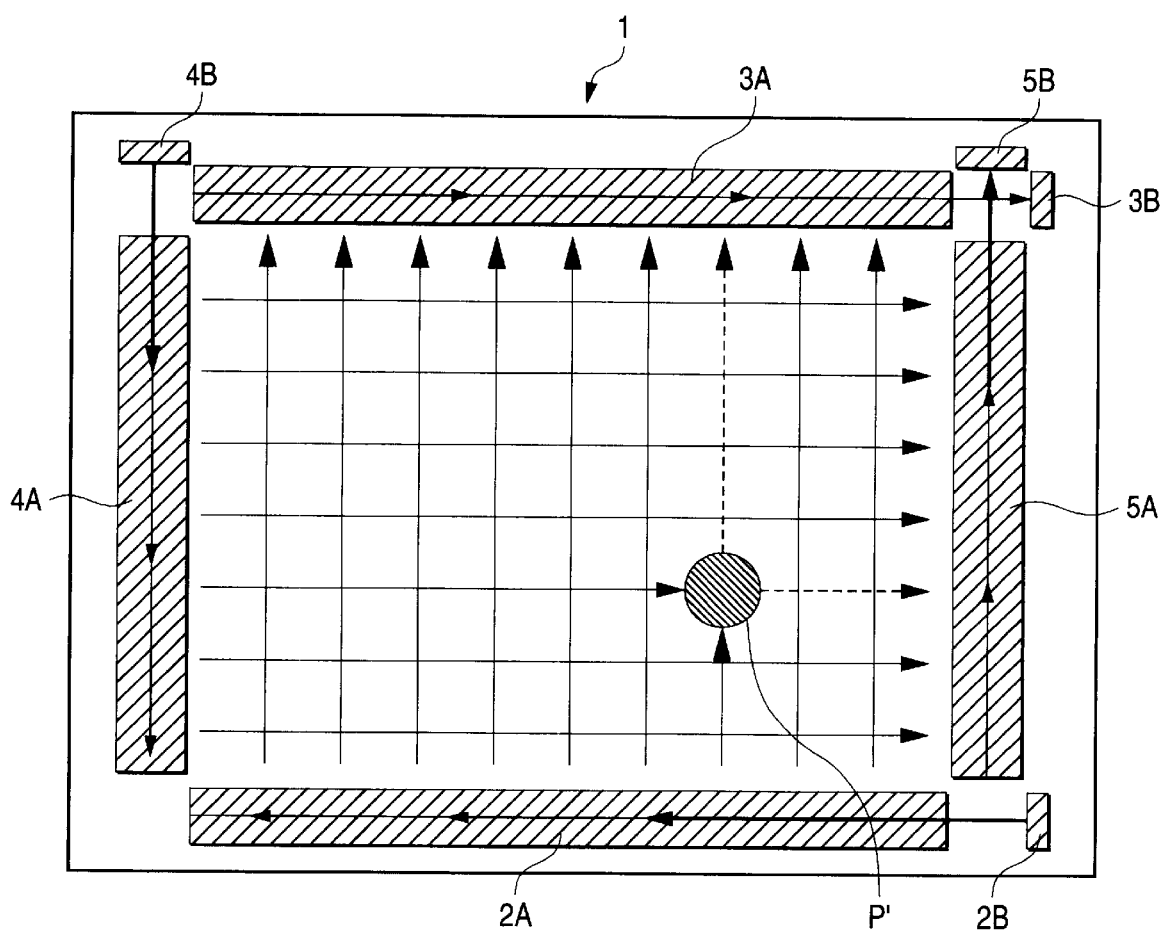
FIG. 25 is a view showing an example in the conventional art.

FIG. 23 is a side view showing an example of the input pen 12 in which a change-over switch SW for setting manually the frequency and the output level in the frequency/output-level setting circuit 12D is provided. FIG. 24 is a block diagram showing connection state of the internal circuit of the input pen 12.

In this example, the change-over switch SW is provided externally and also the power switch 12C and the LED 12H are externally provided.

In FIG. 24, the change-over switch SW is connected to the frequency/output-level setting circuit 12D such that the set value of the frequency or the output level of the ultrasonic wave in the frequency/output-level setting circuit 12D is switched by switching the change-over switch SW.

Then, the configuration is similar to the connection example in FIG. 5 except that the touch sensor S participates only in ON/OFFs of the power switch 12C and the LED 12H.

In the example in FIG. 23 and FIG. 24, since the set value o f the frequency or the output level of the ultrasonic wave can be switched in the frequency/output-level setting circuit 12D by switching the change-over switch SW, like the above case, the desired image can be displayed at the touch position according to the attributes between the previously set frequency or output level of the ultrasonic wave and the display image at the touch position by the input pen.

What is claimed is:

1. A touch panel device for displaying information containing predetermined attributes comprising:
    a flat display device;
    a touch panel in front of the flat display device;
    an input pen for touching the touch panel, the input pen comprising: a signal oscillating section for oscillating a signal; a setting section for setting a frequency or an output level of the oscillated signal from the signal oscillating section; and a set value changing section for changing a set value of the frequency or the output level in the setting section;
    a sensing section for sensing the frequency or the output level of the oscillated signal from the signal oscillating section in the input pen at a touch position on the touch panel by the input pen;
    an attribute setting section for setting the attributes of input information in response to the frequency or the output level of the oscillated signal sensed by the sensing section; and
    a displaying section for displaying the input information on the flat display device based on the attributes set by the attribute setting section,
    wherein the input pen has an opening portion formed at a top end portion, and the oscillated signal that is output by the signal oscillating section being built in the input pen is oscillated from the opening portion to have a directivity of 360 degree around a penholder of the input pen.

2. The touch panel device according to claim 1, wherein the attributes of the input information are colors of the input information to be displayed on the flat display device.

3. The touch panel device according to claim 1, wherein the attributes of the input information are image sizes of the input information to be displayed on the flat display device.

4. The touch panel device according to claim 1, wherein the attributes of the input information are image types of the input information to be displayed on the flat display device.

5. The touch panel according to claim 1, wherein the set value changing section of the input pen is a sensor section sensing a pressure generated when the input pen touches the touch panel, and wherein the sensor section changes the set value of the frequency or the output level set by the setting section according to the sensed pressure.

6. The touch panel device according to claim 1, wherein the set value changing section of the input pen is a sensor section sensing a number of times touched or a touching time when the input pen touches the touch panel, and wherein the sensing section changes the set value of the frequency or the output level set by the setting section according to the number of times touched or the touching time.

7. The touch panel device according to claim 5, further comprising:
    a light emitting section provided to the input pen and connected to the sensor section, and turned ON when touch of the input pen onto the touch panel is sensed by the sensor section.

8. The touch panel device according to claim 1, wherein the set value changing section of the input pen is a change-over switch section that is provided to the input pen and changes the set value of the frequency or the output level set by the setting section by switching the change-over switch section.

9. The touch panel device according to claim 1, wherein the oscillated signal oscillated by the signal oscillating section of the input pen is an acoustic wave or a ultrasonic wave.

10. The touch panel device according to claim 1, wherein the sensing section is a microphone.

11. The touch panel device according to claim 1, wherein the signal oscillating section is a piezoelectric loudspeaker containing a piezoelectric element.

12. The touch panel device according to claim 1, wherein an inner wall surface of the pen point portion of the input pen has a circular cone shape such that a diameter is reduced smaller toward a top end side;
    an inside of the circular cone shape is communicated to an outside via an opening portion that is formed on a top end of the input pen; and
    the oscillated signal output from the signal oscillating section via the inside of the circular cone shape formed at the pen point portion of the input pen is oscillated from the opening portion.

13. The touch panel device according to claim 1, wherein a top end of the input pen is formed in a spherical shape; and an opening portion that oscillates the oscillated signal being output from the signal oscillating section to an outside is formed on an outer peripheral surface of the input pen in rear of the top end having a spherical shape.

14. The touch panel device according to claim 1, wherein the input pen has a battery member that supplies a drive power to the signal oscillating section therein; and a holder for holding the input pen is prepared, the holder having a charging member that charges the battery member of the input pen when the input pen is held by the holder.

15. The touch panel device according to claim 1, further comprising an oscillating signal absorbing member for absorbing the oscillated signal oscillated from the signal oscillating sections provided to edge portions of the touch panel.

16. The touch panel device according to claim 1, wherein the flat display device is formed by a plasma display panel.

17. A touch panel device for displaying information containing predetermined attributes comprising:

a flat display device;

a touch panel in front of the flat display device;

an input pen for touching the touch panel, the input pen comprising: a signal oscillating section for oscillating a signal; a setting section for setting a frequency or an output level of the oscillated signal from the signal oscillating section; and a set value changing section for changing a set value of the frequency or the output level in the setting section;

a sensing section for sensing the frequency or the output level of the oscillated signal from the signal oscillating section in the input pen at a touch position on the touch panel by the input pen;

attribute setting means for setting the attributes of input information in response to the frequency or the output level of the oscillated signal sensed by the sensing section; and a displaying section for displaying the input information on the flat display device based on the attributes set by the attribute setting section, wherein the input pen has an opening portion formed at a top end portion, and the oscillated signal that is output by the signal oscillating section being built in the input pen is oscillated from the opening portion to have a directivity of 360 degree around a penholder of the input pen.

18. The touch panel device according to claim 17, where in the attributes of the input information are colors of the input information to be displayed on the flat display device.

19. The touch panel device according to claim 17, wherein the attributes of the input information are image areas of the input information to be displayed on the flat display device.

20. The touch panel device according to claim 17, wherein the attributes of the input information are image types of the input information to be displayed on the flat display device.

21. The touch panel according to claim 17, wherein the set value changing section of the input pen is a sensor section sensing a pressure generated when the input pen touches the touch panel, and wherein the sensor section changes the set value of the frequency or the output level set by the setting section according to the sensed pressure.

22. The touch panel device according to claim 17, wherein the set value changing section of the input pen is a sensor section sensing a number of times touched or a touching time when the input pen touches the touch panel, and wherein the sensing section changes the set value of the frequency or the output level set by the setting section according to the number of times touched or the touching time.

23. The touch panel device according to claim 21, further comprising:

a light emitting section provided to the input pen and connected to the sensor section, and turned ON when touch of the input pen onto the touch panel is sensed by the sensor section.

24. The touch panel device according to claim 17, wherein the set value changing section of the input pen is change-over switch section that is provided to the input pen and changes the set value of the frequency or the output level set by the setting section by switching the change-over switch section.

25. The touch panel device according to claim 17, wherein the oscillated signal oscillate by the signal oscillating section of the input pen is an acoustic wave or a ultrasonic wave.

26. The touch panel device according to claim 17, wherein the sensing section is a microphone.

27. The touch panel device according to claim 17, wherein the signal oscillating section is a piezoelectric loudspeaker containing a piezoelectric element.

28. The touch panel device according to claim 17, wherein an inner wall surface of the pen point portion of the input pen has a circular cone shape such that a diameter is reduced smaller toward a top end side;

an inside of the circular cone shape is communicated to an outside via an opening portion that is formed on a top end of the input pen; and the oscillated signal output from the signal oscillating section via the inside of the circular cone shape formed at the pen point portion of the input pen is oscillated from the opening portion.

29. The touch panel device according to claim 17, wherein a top end of the input pen is formed in a spherical shape; and an opening portion that oscillates the oscillated signal being output from the signal oscillating section to an outside is formed on an peripheral surface of the input pen in rear of the top end having a spherical shape.

30. The touch panel device according to claim 17, wherein the input pen has a battery member that supplies a drive power to the signal oscillating section therein; and a holder for holding the input pen is prepared, the holder having a charging member that charges the battery member of the input pen when the input pen is held by the holder.

31. The touch panel device according to claim 17, further comprising an oscillating signal absorbing member for absorbing the oscillated signal oscillated from the signal oscillating section provided to edge portions of the touch panel.

32. The touch panel device according to claim 17, wherein the flat display device is formed by a plasma display panel.

* * * * *